United States Patent
Akashi et al.

(10) Patent No.: US 6,414,426 B1
(45) Date of Patent: *Jul. 2, 2002

(54) HIGH-EFFICIENCY LIGHT SOURCE

(75) Inventors: Izumi Akashi, Hirakata; Masanori Shimizu, Kyotanabe; Shoetsu Sakamoto, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/171,078

(22) PCT Filed: Feb. 10, 1998

(86) PCT No.: PCT/JP98/00548

§ 371 (c)(1),
(2), (4) Date: Mar. 23, 1999

(87) PCT Pub. No.: WO98/36441

PCT Pub. Date: Aug. 20, 1998

Related U.S. Application Data

(60) Continuation-in-part of application No. 09/329,419, filed on Jun. 10, 1999, now Pat. No. 6,153,971, which is a division of application No. 08/836,842, filed on Aug. 4, 1997, now Pat. No. 6,224,240.

(30) Foreign Application Priority Data

| Feb. 13, 1997 | (JP) | 9-028616 |
| Mar. 13, 1997 | (JP) | 9-058931 |
| Sep. 29, 1997 | (JP) | 9-263204 |

(51) Int. Cl.[7] .................. H01J 61/44; H01J 61/20
(52) U.S. Cl. ................. 313/486; 313/487; 252/301.4 P
(58) Field of Search ................... 313/486, 485, 313/487; 252/301.4 P; 362/230, 231

(56) References Cited

U.S. PATENT DOCUMENTS

| 4,075,532 A | | 2/1978 | Piper et al. |
| 4,079,287 A | | 3/1978 | Offerle et al. |
| 6,153,971 A | * | 11/2000 | Shimizu et al. ............. 313/486 |
| 6,224,240 B1 | | 5/2001 | Shimizu et al. |

FOREIGN PATENT DOCUMENTS

| EP | 0 552 513 | 7/1993 |
| JP | 51-85283 | 7/1976 |
| JP | 58-66247 | 4/1983 |
| JP | 58-112239 | 7/1983 |

(List continued on next page.)

OTHER PUBLICATIONS

Ivey, Henry F., "Color and Efficiency of Fluorescent and Fluorescent–Mercury Lamps", Journal of the Optical Society of America, vol. 62, No. 6, (1972) pp. 814–822.

Boynton, Robert M. and Olson, Conrad X., "Locating Basic Colors in the OSA Space", Color Res. & Appl., vol. 12,. No. 2 (1987) pp. 94–105.

(List continued on next page.)

*Primary Examiner*—Ashok Patel
(74) *Attorney, Agent, or Firm*—Ratner & Prestia

(57) ABSTRACT

A fluorescent lamp ensures categorical color perception for surface colors of at least red, green, blue, yellow and white, while improving the luminous efficiency in scotopic vision and mesopic vision or in a wide visual field, wherein dominant radiation is obtained from a phosphor which has peak emission wavelength in a wavelength region from 530 to 580 nm and a region from 600 to 650 nm, flux ratio of a phosphor having peak emission wavelength in a wavelength region from 420 to 530 nm is set to 4 to 40% of the total flux radiated in the dominant wavelength band, correlated color temperature of the lamp light color is set to 3500 K to ∞ and Duv (Duv=Δuv×1000, Δuv is the distance of color point from Plankian locus on the CIE 1960 uv chromaticity diagram) is set within a range from 5 to 70.

28 Claims, 29 Drawing Sheets

FOREIGN PATENT DOCUMENTS

| | | |
|---|---|---|
| JP | 58-225552 | 12/1983 |
| JP | 60-89061 | 5/1985 |
| JP | 64-2246 | 1/1989 |
| JP | 2-256153 | 10/1990 |
| JP | 5-225959 | 9/1993 |
| JP | 6-124689 | 5/1994 |
| JP | 7-94146 | 4/1995 |
| JP | 10-21883 | 1/1998 |
| JP | 10-116589 | 5/1998 |

OTHER PUBLICATIONS

Uchikawa, K. and Boynton, R.M., "Categorical Color Perception of Japanese Observers: Comparison With That of Americans", Vision Res., vol. 27, No. 10, (1987) pp. 1825–1833.

Commission Internationale de l'Eclairage: Review of the Official Recommendations of the CIE for the Colours of Signal Lights, CIE Technical Report CIE107–1994.

W. G. Pracejus, "Preliminary Report on a New Approach to Color Acceptance Studies", Illuminating Engineering, (Dec. 1967), pp. 663–673.

"Fluorescent Material Handbook", Complied by Fluorescent Material Academy, Ed. 1, Ohm Pub. Ltd., Dec. 25, 1987.

Japanese Official Action for Patent Appln. Hei 9–512584 dated Jun. 8, 1999 with English translation.

Search Report for Counterpart Singapore Appln. No. 9702562–1 dated Jun. 8, 1999 (conducted by the Australian Patent Office).

"Classification of Fluorescent Lamps by Chromaticity and Colour Rendering Property," Japanese Industrial Standard (JIS) (1983).

"Chromaticity Classification of Fluorescent Lamps," Japanese Industrial Standard (JIS) (1976).

* cited by examiner

Comparison of various spectral luminous efficiencies

Comparison of various spectral luminous efficiencies

———— $V(\lambda)$
------- $V_{b.2}(\lambda)$
— — — $V_{b.10}(\lambda)$

Relative spectral sensitivities of cone and rod cells

——— L cone cell
- - - - - - M cone cell
- - - - - S cone cell
— — — Rod cell

Correction factor F for luminance on x-y chromaticity coordinate plane

Chromaticity classification of colors and chromaticity range of new fluorescent lamp under patent application An example of spectral distribution when the new high-efficiency light source is constituted from fluorescent lamp (20W) under patent application Relation between chromaticity, generated by blending light emitted by halophosphate phosphor (daylight, white daylight, white light) and light emitted by LAP, and chromaticity range of the invention Quadratic curve: $fx^2+gy^2+hxy+ix+jy+k=0$ $f= 0.6179 \quad i=-0.2205$
$g= 0.6179 \quad j=-0.1765$
$h=-0.7643 \quad k= 0.0829$

HIGH-EFFICIENCY LIGHT SOURCE

THIS APPLICATION IS A U.S. NATIONAL PHASE APPLICATION OF PCT INTERNATIONAL APPLICATION PCT/JP98/00548.

This application is a continuation-in-part of application Ser. No. 09/329,419, filed Jun. 10, 1999, now U.S. Pat. No. 6,153,971, which is a division of application 08/836,842, filed Aug. 4, 1997, now U.S Pat. No. 6,224,240.

TECHNICAL FIELD

The present invention relates to a high efficiency illuminating light source which ensures such a level of color reproduction that allows categorical color perception for surface colors of at least red, green, blue, yellow white, and black on which categorical color perception of the human visual characteristics is based.

The invention relates to the following three major technologies.

The first is a fluorescent lamp and a metal halide lamp for providing high-efficiency illuminating light source which allows high luminous brightness in mesopic vision and scotopic vision or in wide visual field, while ensuring such a level of color reproduction that allows categorical color perception for surface colors of at least red, green, blue, yellow, white and black.

The second is a fluorescent lamp and a metal halide lamp for providing illumination which has whiteness in the light color without causing sense of incongruity when used in conjunction with a conventional high temperature light source, while ensuring such a level of color reproduction that allows categorical color perception for surface colors of at least red, green, blue, yellow, white and black.

The third is a fluorescent lamp and a metal halide lamp for providing high-efficiency illumination which has light color equivalent to incandescent lamp color without causing sense of incongruity when used in conjunction with a conventional low color temperature light source, while ensuring such a level of color reproduction that allows categorical color perception for surface colors of at least red, green, blue, yellow, white and black.

BACKGROUND ART

In conventional lamps, spectral characteristic has been designed by evaluating the subtle color reproduction quality in terms of general color rendering index (Ra) with reference to a reference light source (black body radiation, reconstituted daylight radiator). In contrast, a Japanese patent application (Application No. JAP-HEI 7-242863(Sep. 21, 1995), PCT/jp96/02618 based on said Japanese application, discloses a method of optimizing the design of spectral characteristic by applying such human visual characteristics that human recognizes color roughly (namely categorical color perception).

This method made it possible to provide high-efficiency light sources while ensuring such a level of color reproduction that allows categorical color perception for surface colors of at least red, green, blue, yellow, white and black on which categorical color perception of the human visual characteristics is based. A point of achieving the light source realizing categorical color perception with high-efficiency is to concentrate the wavelength of light into wavelength bands mainly of green and red. Such a light source will be called new high-efficiency light source hereinafter.

The new high-efficiency light source which is designed with preference placed on the light emission efficiency while satisfying the minimum requirement of color reproduction is often used for exterior lighting, load lighting, street lighting, etc. This is because exterior, road, street, etc. does not require high fidelity quality color reproduction which is required for interior lighting, with emphasis placed on the luminous efficacy of the light source.

And another point to realizing such new high-efficiency light source is to set the deviation from Planckian locus (Duv) to be 0 or positive on uv chromaticity coordinates.

The range where deviation from Planckian locus (Duv) is 0 or higher is the region which allows categorical color perception of the basic colors with high efficiency. Therefore, the new high-efficiency light source takes positive values of Duv as far as categorical color reproduction of the basic colors can be maintained. Now a portion which has not been utilized in the conventional light sources other than the new high-efficiency light source, in the range of positive Duv values will be described in detail below.

As an international standard related to the classification of chromaticity of illuminating light sources for describing the light source colors, IEC (International Electrotechnical Commission) standard has been used. Various countries of the world also have their own standards. One of these is the chromaticity classification standard for fluorescent lamps specified in JIS (Japanese Industrial Standards) used in Japan.

The IEC standard determines light colors in terms of tolerance with reference to a central point which is preset in the vicinity of the Planckian locus, while the JIS defines upper and lower limitation lines in the vicinity of the Planckian locus and specifies the inner region of the limitation lines as the tolerable region.

Conventional lamps have been developed with care not to allow the emission to deviate upward from the Planckian locus (positive side of Duv), from the viewpoint of evaluating the color rendering performance of the prior art.

In actuality, however, width of the tolerable range is from 7.5 to 9.5 in terms of Duv in the vertical direction in the case of the IEC, and from 10 to 19 in the case of JIS, and therefore illuminating light sources having light colors in a range from 0 to 5 of Duv on the positive side have been used in the prior art.

As a standard for describing the applicable range of light source in terms of white color from a different point of view, there is the CIE standard for signal light color. According to this standard, the region on the positive side of Duv out of a narrow white color region specified along the Planckian locus has not been utilized as illuminating light source of white light.

An object of the invention is to improve the impression of brightness in mesopic vision and scotopic vision of the new high-efficiency light source. It is known that, under photopic vision condition where the illuminance is high, cone cells among the visual cells work, and under scotopic vision where the illuminance is low, rod cells among the visual cells work, while under mesopic vision where the illuminance is at the intermediate level between the above two, both cone cells and rod cells work. However, spectral characteristic of conventional illuminating light sources has been designed assuming photopic vision wherein cone cells work.

In a situation where the new high-efficiency light source is used, instead of a conventional light source designed for exact color reproduction, on the other hand, the illumination is designed with relatively low illuminance (scotopic vision, mesopic vision).

Therefore, it is the first object of the invention to design the spectral characteristic by placing emphasis on a condition of relatively low illuminance while taking into consideration the effect of the rod cells for the new high-efficiency light source.

Second object of the invention is to improve the impression of brightness in wide visual field of the new high-efficiency light source.

While illuminance and luminance are used as the photometric quantities of brightness, spectral characteristic of illuminance and luminance are based on the spectral characteristic of brightness measured in a visual angle of 2° in the fovea centralis of the eye. However, because the eye receives light not only from a range limited around the fovea centralis but also from a wider visual field in the actual illumination environment, there have been such cases that actual impression of brightness is different from the illuminance, depending on the spectral distribution of the light source.

Thus the second object of the invention is to set such spectral characteristic of the new high-efficiency light source that improves the impression of brightness in a wide field of view which is felt when entering an actual illumination environment.

Third object of the invention is to improve the whiteness of light color of the new high-efficiency light source. The whiteness of the new high-efficiency light source is poor.

Hence the invention aims to improve the whiteness of the new high-efficiency light source as the third object.

Fourth object of the invention is to provide incandescent lamp type color image to the new high-efficiency light source.

That is, the invention aims to provide the impression of an incandescent lamp type color to the new high-efficiency light as a low color temperature light source.

DISCLOSURE OF THE INVENTION

An illuminating light source of the invention has the following means for improving the luminous brightness in mesopic vision and scotopic vision and improving the brightness in wide field view of the new high-efficiency light source.

One aspect is a fluorescent lamp which ensures categorical color perception for surface colors of at least red, green, blue, yellow and white, while improving the luminous efficiency in scotopic vision and mesopic vision or in a wide visual field, wherein dominant radiation is obtained from a phosphor which has peak emission wavelength in a wavelength region from 530 to 580 nm and a region from 600 to 650 nm, flux ratio of a phosphor having peak emission wavelength in a wavelength region from 420 to 530 nm is set to 4 to 40% of the total flux radiated in the dominant wavelength band, correlated color temperature of the lamp light color is set to 3500 K to ∞ and Duv (distance from perfect radiator locus on uv coordinates) is set within a range from 5 to 70.

Another aspect is a fluorescent lamp which ensures categorical color perception for surface colors of at least red, green, blue, yellow and white, while improving the luminous efficiency in scotopic vision and mesopic vision or in a wide visual field, wherein dominant radiation is obtained from a phosphor which has peak emission wavelength in a wavelength region from 530 to 580 nm and a region from 600 to 650 nm, flux ratio from a phosphor having peak emission wavelength in a wavelength region from 470 to 530 nm is set to 4 to 40% of the total flux radiated in the dominant wavelength band, correlated color temperature of the lamp light color is set to 3500 K to ∞ and Duv (distance from perfect radiator locus on uv coordinates) is set within a range from 5 to 70.

Yet another aspect is a fluorescent lamp which ensures categorical color perception for surface colors of at least red, green, blue, yellow and white, while improving the luminous efficiency in scotopic vision and mesopic vision or in a wide visual field, comprising phosphors having peak emission wavelengths in wavelength regions from 420 to 530 nm, 530 to 580 nm and 600 to 650 nm and light colors in a region of y<−0.43x+0.60, y>0.64x+0.15 and x>0.16 on the x-y chromaticity coordinate plane.

Still another aspect is a fluorescent lamp which ensures categorical color perception for surface colors of at least red, green, blue, yellow and white, while improving the luminous efficiency in scotopic vision and mesopic vision or in a wide visual field, comprising phosphors having peak emission wavelength in wavelength regions from 470 to 530 nm, 530 to 580 nm and 600to650 nm and light colors in a region-of y<−0.43x+0.60, y>0.64x+0.15 and x>0.16 on the x-y chromaticity coordinate plane.

Still yet another aspect is the fluorescent lamp of previously described, wherein the phosphor used to obtain the dominant radiation having peak emission wavelength in a wavelength band from 530 to 580 nm is a phosphor activated with terbium or terbium and cerium, a phosphor having peak emission wavelength in a wavelength band from 600 to 650 nm is a phosphor activated with europium or manganese, a phosphor having peak emission wavelength in a wavelength band from 420 to 530 nm and a phosphor having peak emission wavelength in a wavelength band from 470 to 530 nm are phosphors activated with europium or europium and manganese, or antimony or manganese, or antimony and manganese.

Another aspect is a fluorescent lamp, wherein phosphor having peak emission wavelength in wavelength regions from 530 to 580 nm and 600 to 650 nm comprises a single phosphor made of $(Ce,Gd,Tb)(Mg,Mn)B_5O_{10}$ and $(Ce,Gd)(Mg,Mn)B5O_{10}$.

The invention may also include a fluorescent lamp, wherein a phosphor having peak emission wavelength in a wavelength region from 420 to 530 nm and a phosphor having peak emission wavelength in a wavelength region from 470 to 530 nm are halophosphate phosphor.

Also included is a fluorescent lamp, wherein a phosphor having peak emission wavelength in wavelength region from 420 to 530 nm is $BaMgAl_{10}O_{17}$:Eu, $(Sr,Ca,Ba)_{10}(PO_4)_6Cl_2$:Eu or $BaMgAl_{10}O_{17}$:Eu,Mn.

Also included is a fluorescent lamp, wherein a phosphor having peak emission wavelength in wavelength region from 470 to 530 nm is $Sr_4Al_{14}O_{25}$:Eu or $Ce(Mg,Zn)Al_{11}O_{19}$:Mn.

Another aspect is a fluorescent lamp, which includes a phosphor having peak emission wavelength in wavelength regions from 420 to 470 nm and a phosphor having peak emission wavelength in wavelength regions from 470 to 530 nm at the same time.

In addition, the invention includes a fluorescent lamp, wherein the phosphor having peak emission wavelength in wavelength regions from 420 to 470 nm and the phosphor having peak emission wavelength in wavelength regions from 470 to 530 nm are $(Ba,Sr)MgAl_{10}O_{17}$:Eu,Mn.

When the new high-efficiency light source is used in conjunction with the conventional high color temperature light source, the illuminating light source of the invention has the following means for improving the whiteness of the light color.

Also included is a fluorescent lamp which ensures categorical color perception for surface colors of at least red, green, blue, yellow and white, while improving the whiteness of the light color, wherein dominant radiation is obtained from a phosphor which has peak emission wavelengths in a wavelength region from 530 to 580 nm and a region from 600 to 650 nm, a phosphor which has peak emission wavelength in a wavelength region from at least 420 to 470 nm is included as sub-emission, correlated color temperature is set to 3500 K to ∞, Duv (distance from perfect radiator locus on uv coordinates) is set within an area of y<−0.43x+0.60 in the range from 5 to 70 on the x-y chromaticity coordinate plane.

Another aspect is a fluorescent lamp which ensures categorical color perception for surface colors of at least red, green, blue, yellow and white, while improving the whiteness of the light color, wherein dominant radiation is obtained from a phosphor which has peak emission wavelength in a wavelength region from 530 to 580 nm and a region from 600 to 650 nm, a phosphor which has peak emission wavelength in a wavelength region from at least 420 to 470 nm is included as sub-emission, and chromaticity points (x, y) are located in an area of y<−0.43x+0.60 within the region enclosed by a: (0.228, 0.351), b: (0.358, 0.551), c: (0.525, 0.440), d: (0.453, 0.440, e: (0.285, 0.332) on the x-y chromaticity coordinate plane.

Also included is a fluorescent lamp which ensures categorical color perception for surface colors of at least red, green, blue, yellow and white, while improving the whiteness of the light color, wherein dominant radiation is obtained from a phosphor which has peak emission wavelength in a wavelength region from 530 to 580 nm, and chromaticity points (x, y) are located in an area of y<−0.43x+0.60 within the region enclose by a: (0.228, 0.351), b: (0.358, 0.551), c: (0.525, 0.440), d: (0.453, 0.440, e: (0.285, 0.332) on the x-y chromaticity coordinate plane.

The present invention also includes a fluorescent lamp, wherein proportion of flux emitted by a phosphor which has peak emission wavelength in the sub-emission wavelength region from 420 to 470 nm and flux emitted by a phosphor which has peak emission wavelength in wavelength region from 530 to 580 nm is set to B:G with B being set within a range from 4 to 11% and G being set within a range from 96 to 89%.

Also included is a fluorescent lamp, wherein flux emitted by a phosphor which has peak emission wavelength in a range from 600 to 650 nm and the sum of flux emitted by a phosphor which has peak emission wavelength in a range from 420 to 470 nm and flux emitted by a phosphor which has peak emission wavelength in a range from 530 to 580 nm are blended in a ratio of R:(B+G) where R is set within a range from 0 to 28% and B+G is within a range from 100 to 72%.

Included also is a fluorescent lamp, wherein a phosphor activated with europium is used as the phosphor having peak emission wavelength in a range from 420 to 470 nm, a phosphor activated with terbium or terbium and cerium is used as the phosphor having peak emission wavelength in a region from 530 to 580 nm, and a phosphor activated with manganese or europium is used as the phosphor having peak emission wavelength in a range from 600 to 650 nm.

The invention also includes a fluorescent lamp, which is constituted from a phosphor activated with terbium having peak emission wavelength in a region from 530 to 580 nm and halophosphate phosphor.

The present invention also includes a fluorescent lamp, wherein phosphor having peak emission wavelength in wavelength regions from 530 to 580 nm and 600 to 650 nm comprises a single phosphor made of $(Ce,Gd,Tb)(Mg,Mn)B_5O_{10}$ and $(Ce,Gd)(Mg,Mn)B_5O_{10}$.

The present invention includes a fluorescent lamp, wherein a phosphor having peak emission wavelength in wavelength region from 420 to 470 nm is $BaMgAl_{10}O_{17}$:Eu, $(Sr,Ca,Ba)_{10}(PO_4)_6Cl_2$:Eu or $BaMgAl_{10}O_{17}$:Eu,Mn.

When the new high-efficiency light source is used in conjunction with the conventional low color temperature light source, the illuminating light source of the invention has the following means for improving the sense of incongruity of the light color as incandescent color.

The present invention also includes a fluorescent lamp which ensures categorical color perception for surface colors of at least red, green, blue, yellow and white, wherein dominant radiation is obtained from a phosphor which has peak emission wavelength in a wavelength region from 530 to 580 nm and a region from 600 to 650 nm, correlated color temperature is set to 1700 K to ∞, and the emission light color is set within a range where the region of Duv (distance from perfect radiator locus on uv coordinates) from 5 to 70 and the region of chromaticity point (x, y) inside quadratic curve of $fx^2+gy^2+hxy+ix+jy+k=0$ (f=0.6179, g=0.6179, h=−0.7643, i=−0.2205, j=−0.1765, k=0.0829) overlap each other on the x-y chromaticity coordinate plane.

The present invention additionally includes a fluorescent lamp which ensures categorical color perception for surface colors of at least red, green, blue, yellow and white., wherein dominant radiation is obtained from a phosphor which has peak emission wavelength in a wavelength region from 530 to 580 nm and a region from 600 to 650 nm, the region of chromaticity point (x, y) is in a region which is the inside part of the quadratic curve of $fx^2+gy^2+hxy+ix+jy+k=0$ (f=0.6179, g=0.6179, h=−0.7643, i=−0.2205, j=−0.1765, k=0.0829) other than the area defined by 1 to v range enclosed by line segments connecting the chromaticity points l: (0.4775, 0.4283), m: (0.4594, 0.3971), n: (0.4214, 0.3887), o: (0.4171, 0.3846), p: (0.3903, 0.3719), q: (0.3805, 0.3642), r:

(0.3656, 0.3905), s: (0.3938, 0.4097), t: (0.4021, 0.4076), u: (0.4341, 0.4233) and v: (0.4348, 0.4185) on the x-y chromaticity coordinate plane.

The present invention also includes a fluorescent lamp which obtains predominant radiation from a phosphor having peak emission wavelength in a wavelength region from 530 to 560 nm and a region from 600 to 650 nm, wherein proportion of flux emitted by a phosphor which has peak emission wavelength in the wavelength region from 530 to 560 nm and flux emitted by a phosphor which has peak emission wavelength in wavelength region from 600 to 650 nm is set to G:R (%) with G being set within a range from 70 to 59 and R being set within a range from 30 to 41.

The present invention includes a fluorescent lamp which obtains predominant radiation from a phosphor having peak emission wavelengths in a wavelength region from 530 to 560 nm and a region from 600 to 620 nm and sub-emission is obtained from a phosphor having peak emission wavelength in a wavelength region from 420 to 530 nm, wherein flux ratio (B+BG):G:R (%) of phosphors having peak emission wavelength in wavelength regions from 420 to 530 nm (B+BG), 530 to 560 nm (G) and 600 to 620 nm (R) is set so that B+BG is from 0 to 3, G is from 59 to 71 and R is from 41 to 26.

The present invention includes a fluorescent lamp, wherein a phosphor activated with terbium or terbium and cerium is used as the phosphor having peak emission wavelength in a region from 530 to 580 nm, and a phosphor activated with europium or manganese is used as the phosphor having peak emission wavelength in a range from 600 to 650 nm.

The present invention also includes a fluorescent lamp, wherein phosphor having peak emission wavelength in wavelength regions from 530 to 580 nm and 600 to 650 nm comprises a single phosphor made of $(Ce,Gd,Tb)(Mg,Mn)B_5O_{10}$ and $(Ce,Gd)(Mg,Mn)B_5O_{10}$.

When the invention is applied to a light source other than fluorescent lamp, the illuminating light source of the invention has the following means for solving problems.

The present invention also includes a fluorescent lamp which is used as exterior lighting, road lighting, street lighting, security lighting, car lights, tunnel lighting, public square lighting, warehouse lighting standby lighting or industrial lighting.

The present invention may also be a metal halide lamp which has light color and emission spectrum equivalent to those of the fluorescent lamps discussed above.

The present invention also includes a metal halide lamp which is used as exterior lighting, road lighting, street lighting, security lighting, car lights, tunnel lighting, public square lighting, warehouse lighting standby lighting or industrial lighting.

BEST MODE FOR EXECUTING THE PRESENT INVENTION

The new high-efficiency light source provides a light source of high efficiency while ensuring such a level of color reproduction that allows categorical color perception for surface colors of at least red, green, blue, yellow, white and black, by concentrating the radiation energy in a wavelength band consisting mainly of green and red. In addition to this, the first embodiment of the invention adds radiation in blue or blue-green band thereby to improve the luminous brightness in mesopic vision and scotopic vision or the luminous brightness in wide visual field.

Figure 1:
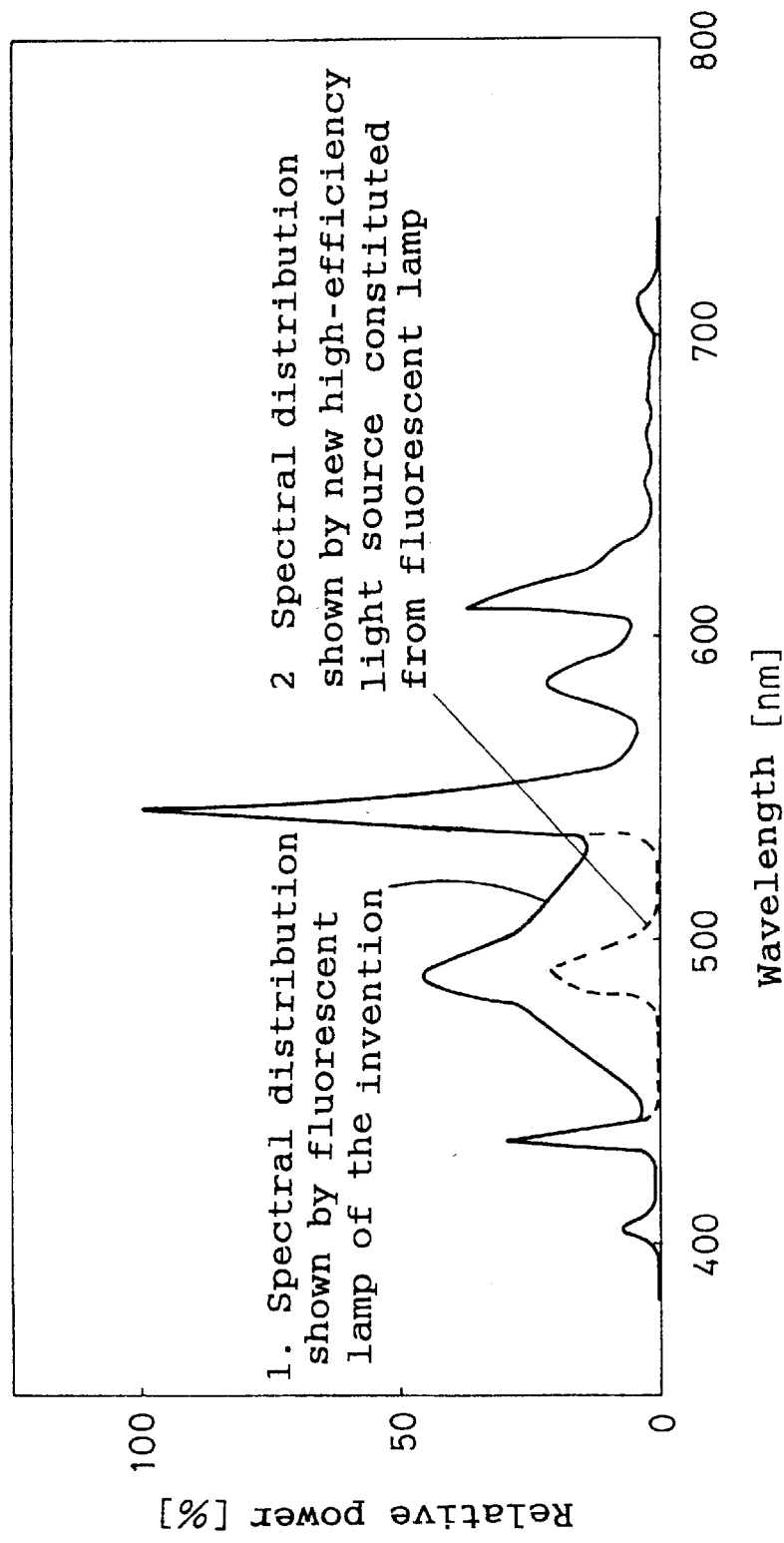
FIG. 1 is a graph showing the spectral characteristic of a fluorescent lamp according to a typical embodiment of the invention.

A fluorescent lamp as a typical embodiment of the invention is shown in FIG. 1.

Solid line 1 in FIG. 1 shows the spectral distribution generated when the invention is embodied with fluorescent lamps. Dashed line 2 shows the spectral distribution generated when the new high-efficiency light source is constituted from fluorescent lamp. According to the invention, as shown in FIG. 1, luminous brightness in mesopic vision and scotopic vision and luminous brightness in wide field of view can be improved over the new high-efficiency light source, by emphasizing the relative power of spectral characteristic of blue or blue-green. The basis for this will be explained in detail below.

Response characteristic to brightness of light varies depending on the spectrum, and is called the relative luminous efficiency or relative luminous efficiency function. Brightness of illumination is generally evaluated in terms of the standard photopic vision spectral luminous efficacy function (hereinafter referred to as $V(\lambda)$) defined by CIE (Commission Internationale de l'Eclairage). This is based on the sensitivity characteristic of the cone cells to brightness under such a condition that the eyes have accustomed to bright environment, namely photopic vision. It is known that the center of sensitivity under this condition is located at 555 nm, and illuminating light sources are usually evaluated in terms of the efficiency of spectral characteristic with respect to $V(\lambda)$.

On the other hand, as an evaluation criterion based on the sensitivity characteristic of rod cells to brightness under such a condition that the eyes have accustomed to dark environment, namely standard scotopic vision, standard scotopic vision spectral luminous efficacy function (hereinafter referred to as V'(λ)) defined by CIE (International Illumination Commission) is used. It is known that the peak of sensitivity under this condition is located at 507 nm.

It is said that eyes work with an intermediate relative luminous efficiency characteristic between the above two, in mesopic vision environment where brightness is at an intermediate level between photopic vision and scotopic vision. Thus the characteristic varies depending on the condition of the eye adapting to the environment.

That is, there is a fact that, in scotopic vision or mesopic vision, sensitivity of the eye to light becomes higher in blue or blue-green band compared to photopic vision. It is indicated that effective or luminous brightness can be improved by enhancing the blue or blue-green portion of the spectrum of the new high-efficiency light source which is often used in environment designed lower illuminance level than the conventional illuminating light sources which are normally designed on the basis of efficiency in photopic vision.

Meanwhile various modifications have been made to the V(λ).

First, Judd's modified color matching function (hereinafter referred to as $V_M(\lambda)$) will be described here. This modification is based on the fact that V(λ) assigns lower than actual values to blue band in the shorter wavelength region. Although it is true that $V_M(\lambda)$ represents the actual response more accurately, it cannot also be denied that changing the photometry system is not desirable. Thus the modified function is not employed in evaluating the brightness of general lamps, although it is authorized as CIE Publication No.86: 2° Spectral luminous efficiency function for photopic vision (1990).

Now a model of relative luminous efficiency based on a different magnitude of view field than V(λ) will be described below. While V(λ) is $V_2(\lambda)$ which is constructed on the basis of central view with a visual angle of 20° in the fovea centralis where the visual acuity is highest, there is another function constructed on the basis of wider visual field (10°), namely $V_{10}(\lambda)$ which is recommended as CIE 1964 supplementary photometry system.

Because light entering the eye in an actual environment is not limited to that coming in a narrow visual field but includes that coming in a wider visual field, $V_{10}(\lambda)$ is considered to better reflect the actual situation when evaluating the impression of brightness in wider visual field.

Cone cells include S (blue) cone cell which has higher sensitivity in short wavelengths, L (red) cone cell which has higher sensitivity in long wavelengths and M (green) cone cell which has higher sensitivity in intermediate wavelengths. Because there are few S cone cells in the fovea centralis and there are many S cone cells at peripheral vision in higher concentration,. assuming a greater visual field leads to greater emphasis being placed on the sensitivity to blue light.

Because the fovea centralis is also void of rod cells and V'(λ) is a relative luminous efficiency constructed at points away from the fovea centralis, it can be seen that blue or blue-green band has greater weight in the correction of light source brightness designed for use with lower illuminance in scotopic vision, mesopic vision and in the correction of brightness perception for light incident on the eye from wider field of view in the actual environment.

In contrast to V(λ) which is constructed on the basis of results obtained by the flicker photometry technique wherein the subject eye is exposed alternately to light of different colors while minimizing the flicker or the sequential comparison technique wherein light of slightly different colors is matched, relative luminous efficiency constructed by the direct matching method wherein brightness is directly compared will be described below.

This technique directly extracts the visual perception of brightness, and is specified as CIE Publication No.75: Spectral luminous efficiency functions based upon brightness matching for monochromatic point sources 20° and 10° fields (1988). Function based on 20° field is called $V_{b,2}(\lambda)$ and one based on 10° field is called $V_{b,10}(\lambda)$, in which case direct visual perception of brightness is well represented but smooth profile is not provided.

However, the direct matching method also overestimates the sensitivity to blue when the field of view is wider, when the difference between $V_{b,2}(\lambda)$ and $V_{b,10}(\lambda)$ is taken into consideration.

Although $V_{10}(\lambda)$, $V_M(\lambda)$, V'(λ), $V_{b,2}(\lambda)$ and $V_{b,10}(\lambda)$ well reflect the actual situation than V(λ) depending on the time and occasion, they are regarded as auxiliary photmetric quantities of brightness and are not used in the brightness evaluation and development of ordinary lamps.

However, on the actual situation when these evaluation functions $V_{10}(\lambda)$, $V_M(\lambda)$, V'(λ), $V_{b,2}(\lambda)$ and $V_{b,10}(\lambda)$ are used integrally, it is made possible to improve the luminous or effective brightness of the new high-efficiency light source which is typically used under relatively low illuminance.

Figure 2:
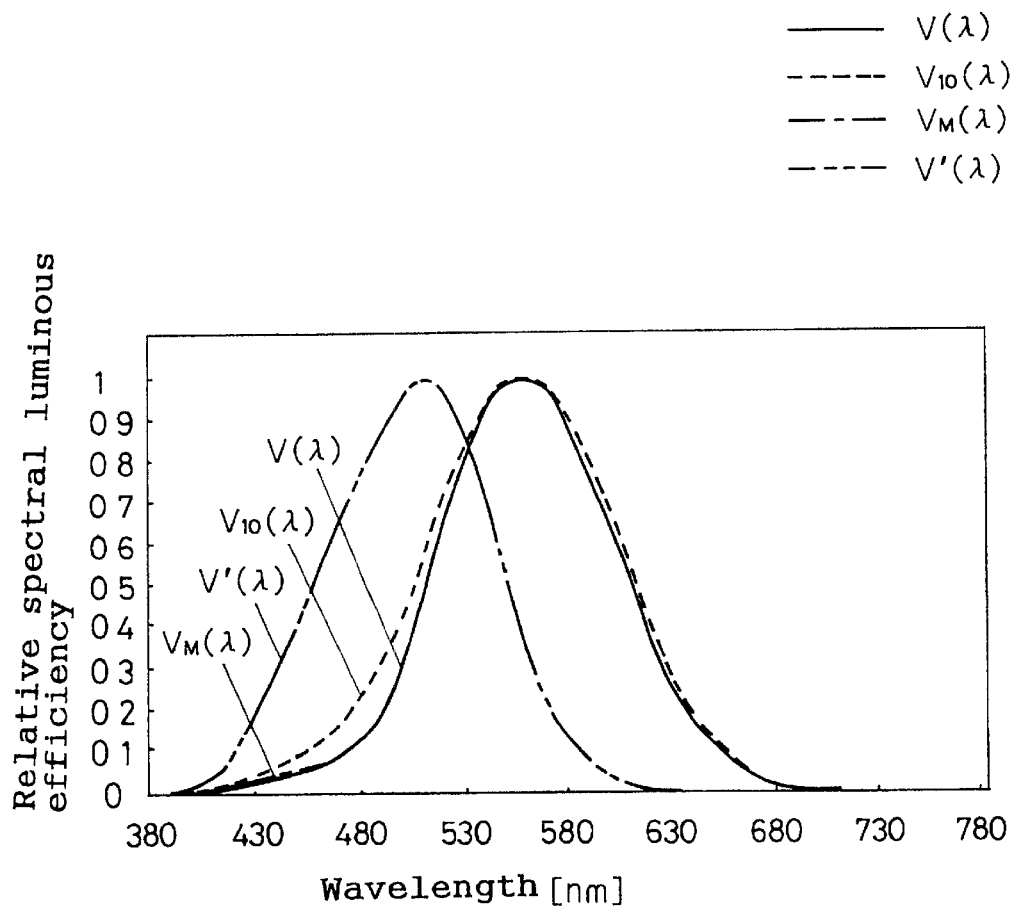
FIG. 2 and FIG. 3 show the comparison of various relative luminous efficiency normalized to peak height which is set to 1.
Figure 3:
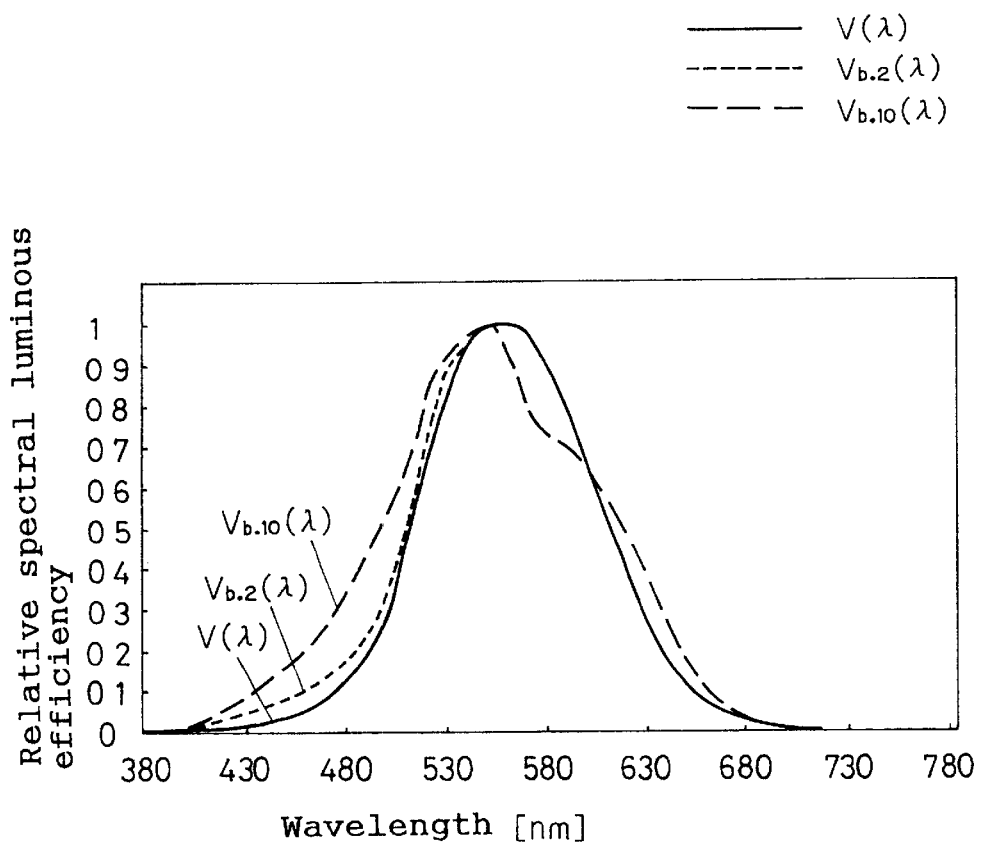

FIG. 2 and FIG. 3 compare various relative luminous efficiencies normalized to the peak height which is set to 1. FIG. 2 shows V(λ), $V_{10}(\lambda)$, $V_M(\lambda)$ and V'(λ). FIG. 3 shows $V_{b,2}(\lambda)$ and $V_{b,10}(\lambda)$ which are derived by a psycophysical technique different from that employed for V(λ), with V(λ) shown as reference.

Figure 4:
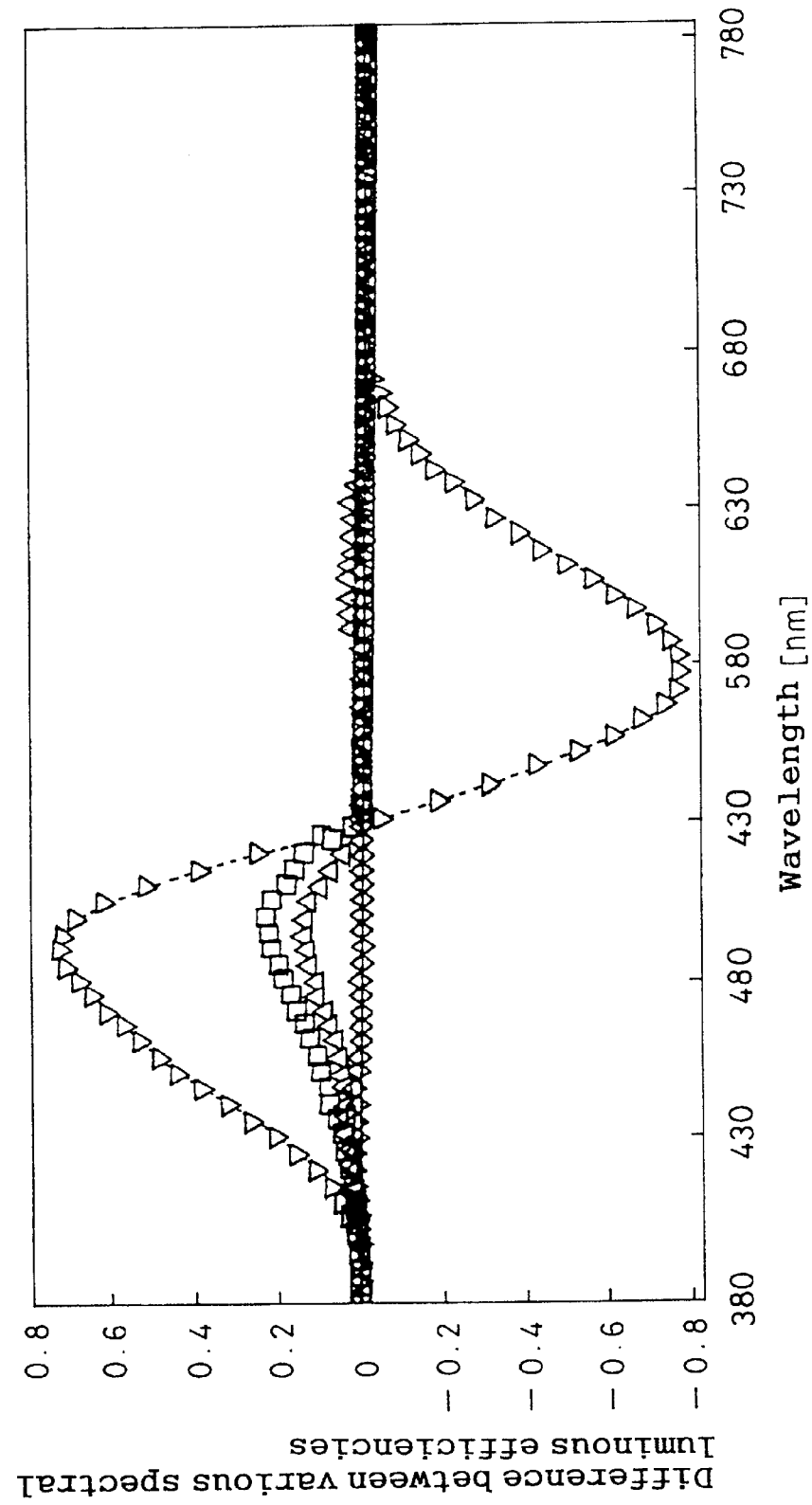
FIG. 4 shows difference between $V_{b,10}(\lambda)$ and $V_{b,2}(\lambda)$, difference between $V_M(\lambda)$ and $V(\lambda)$, difference between $V_{10}(\lambda)$ and $V(\lambda)=V_2(\lambda)$ and difference between $V'(\lambda)$ and $V(\lambda)$.

Based on the above discussion, FIG. 4 shows the difference among various relative luminous efficiencies as difference between $V_{b,10}(\lambda)$ and $V_{b,2}(\lambda)$ difference between $V_M(\lambda)$ and V(λ), difference between $V_{10}(\lambda)$ and V(λ)=$V_2(\lambda)$ and difference between V'(λ) and V(λ).

When these various measures of relative luminous efficiency are taken into consideration, positive side of the graph corresponds to the portion which has been underestimated in the conventional V(λ), showing that the spectral power is concentrated in blue or blue-green band.

When these are studied individually, the following relationships can be derived for the peaks and the ranges of various measures of relative luminous efficiency.

* Peak of difference between $V_{b,10}(\lambda)$ and $V_{b,2}(\lambda)$ occurs at 500 nm, while width of 50% height of peak is in a region from 460 to 520 nm, and width of 80% height of peak is in a region from 480 to 505 nm.

* Peak of difference between $V_M(\lambda)$ and V(λ) occurs at 435 nm, while width of 50% height of peak is in a region from 415 to 450 nm, and width of 80% height of peak is in a region from 420 to 445 nm.

* Peak of difference between $V_{10}(\lambda)$ and V(λ)=$V_2(\lambda)$ occurs at 500 nm, while width of 50% height of peak is in a region from 465 to 515 nm, and width of 80% height of peak is in a region from 480 to 505 nm.

* Peak of difference between V'(λ) and V(λ) occurs at 490 nm, while width of 50% height of peak is in a region from 445 to 515 nm, and width of 80% height of peak is in a region from 470 to 505 nm.

The following findings have also be known which are shown here as mere reference because these are derived by different techniques and therefore cannot be directly compared with the above.

* Peak of difference between $V_{b,2}(\lambda)$ and $V(\lambda)$ occurs at 530 nm, while width of 50% height of peak is divided into a region from 430 to 480 nm and a region from 510 to 535 nm because of distortion in the relative luminous efficiency, and width of 80% height of peak is in a region of 530 nm±2.5 nm.

* Peak of difference between $V_{b,10}(\lambda)$ and $V(\lambda)$ occurs at 500 nm, while width of 50% height of peak is in a region from 450 to 520 nm, and width of 80% height of peak is in a region from 475 to 510 nm.

Under such consideration such range which is on a considerablly positive side and is to be modified on spectral distribution on FIG. 4, is described below.

By combining these correction bands in the wavelength band below the major emission wavelength of the new high-efficiency light source, it can be concluded that the range where correction should be applied is from 420 to 530 nm at the maximum.

The invention is based on this range. Further in this range, a region which allows particularly high effect will be discussed below.

Because $V_M(\lambda)$ primarily represents correction in blue band of wavelengths below 455 nm where S cone cells work and many of corrections made in short wavelength region of the visible radiation are for intrinsically low sensitivity, the region where the highest effect of corrections other than difference between $V_M(\lambda)$ and $V(\lambda)$ can be obtained within the width of 80% height of peak is from 470 to 530 nm.

Figure 5:
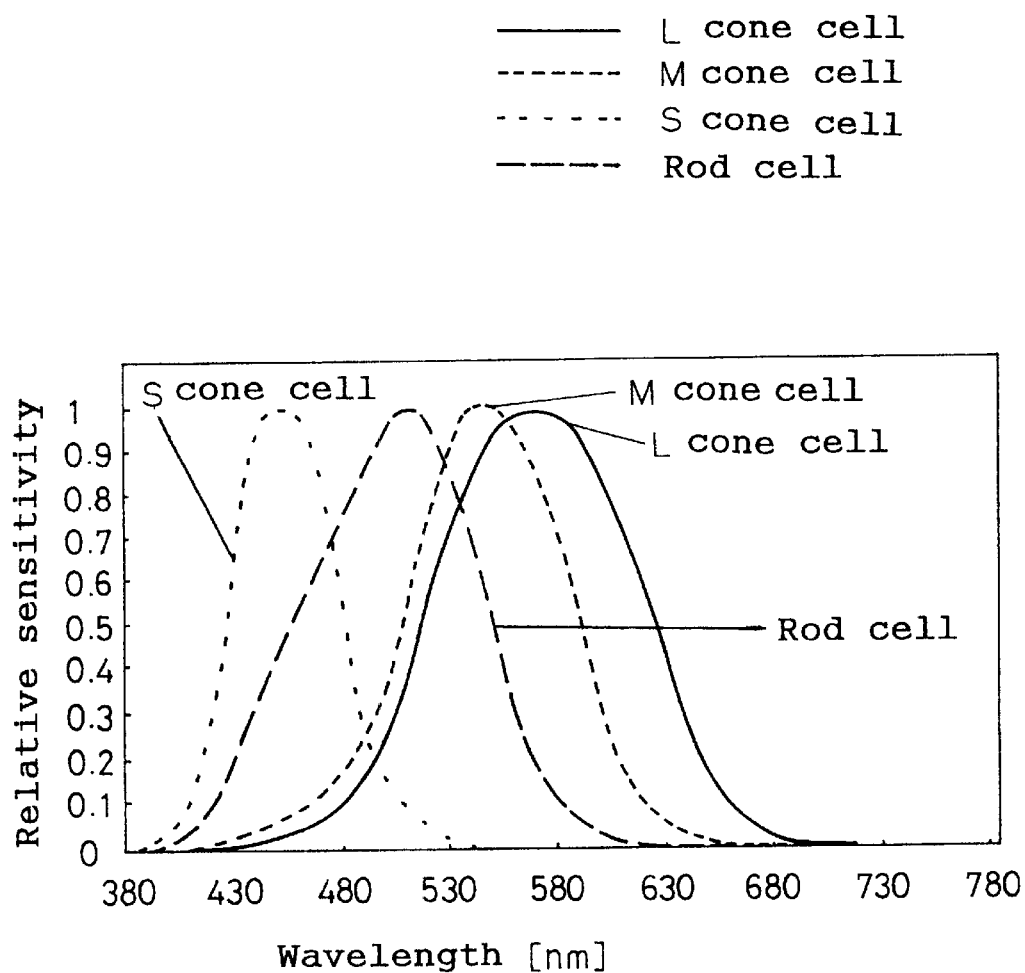
FIG. 5 shows the basic spectral sensitivity of three kinds of cone cell (S cone cell, M cone cell, L cone cell) of the eye and the basic spectral sensitivity of rod cell, normalized to peak height which is set to 1.

FIG. 5 shows the basic spectral sensitivity of three kinds of cone cell (S cone cell, M cone cell, L cone cell) of the eye and the basic spectral sensitivity of rod cell, normalized to peak height which is set to 1.

It can be seen that the rod cell which works in mesopic and acotopic vision and has a peak of spectral sensitivity between those of the S cone cell and the M cone cell.

Ordinary illuminating light sources aim at stimulating three kinds of cone cells (L cone cell, M cone cell and L cone cell) which work in photopic vision, but radiation energy of the new high-efficiency light source is concentrated in green and red bands, thereby to stimulate mainly two kinds of cone cells (M cone cell and L cone cell), thus giving stimulus to the r-g opponent color response system of the visual system.

In the design of conventional illuminating light source, because use in photopic vision is assumed, spectral sensitivity of the rod cells has not been taken into consideration. In contrast, the improvement of scotopic vision, mesopic vision and luminous brightness among the technologies of the invention is based on the stimulation of the two kinds of cone cells (M cone cell and L cone cell) and the rod cells. Thus it is effective to concentrate the portion of radiation energy to be added in the new high-efficiency light source in the blue-green band of wavelengths from 470 to 530 nm, in order to decrease the stimulation to the S cone cell which contributes less to the improvement of brightness perception and improve the efficiency of the stimulation to the rod cells.

Also because the S cone cells are densely distributed around the fovea centralis of the retina, wider field of view leads to overestimation of the sensitivity related to the Scone cells. Therefore, the improvement of luminous brightness in a wide view field among the technologies of the invention can be achieved by placing emphasis on the stimulation of the S cone cells which are densely distributed around the fovea centralis. For this purpose, it is effective to concentrate the portion of radiation to be added in the new high-efficiency light source in the blue band of wavelengths from 420 to 470 nm Because ranges of relative luminous efficiency of the S cone cell and rod cells overlap on the spectrum, wavelength band where both the luminous brightness in mesopic vision and scotopic vision and the luminous brightness in wide field view are to be improved is from 420 to 530 nm. However, since the values of relative luminous efficiency are intrinsically low in short wavelength region of the visible radiation, emphasis is preferably placed on the region from 470 to 530 nm in order to improve the above two aspects.

In order to improve the luminous brightness in mesopic vision and scotopic vision or in a wide field of view while ensuring categorical color perception for illuminated object surface colors of at least red, green, blue, yellow and white, it is preferable to enhance the blue or blue-green component of the lamp color. For this purpose, it is preferable that the correlated color temperature of the lamp color be set to a high level and, in case the correlated color temperature which is the index of ordinary light source colors is used as the index, it is preferably set to 3500 K or higher or alternatively the chromaticity of the lamp color in a range of y<−0.43x+0.60 on the x-y chromaticity coordinate plane.

Figure 6:
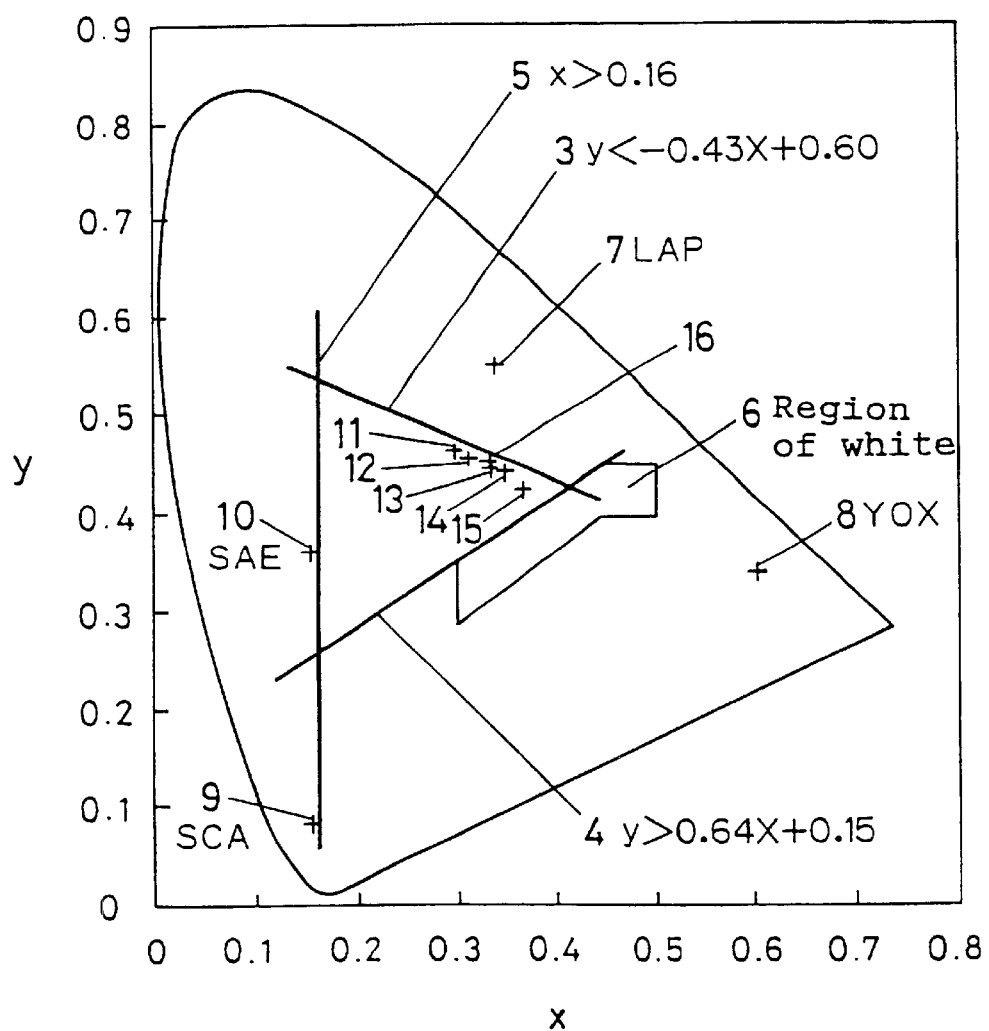
FIG. 6 shows the range of colors the fluorescent lamp of the invention on x-y chromaticity coordinate plane.

FIG. 6 shows the range of the light colors generated by the fluorescent lamps of the invention on the x-y chromaticity coordinate plane. These inventions can be realized by producing the light colors in the region determined by three relations of inequality, y<−0.43x+0.60 of FIGS. 6-3, y>0.64x+0.15 of FIGS. 6-4 and x>0.16 of FIGS. 6-5. The reason will be described below.

The region of y=0.64x+0.15 corresponds to the upper limit of the white lamp light toward green specified in the CIE Technical Report CIE 107-1994;Review of the official recommendations of the CIE for the colours of signal lights.

Thus it is indicated that the invention provides light colors which have values of Duv on the positive side of the light generally used as white light of FIGS. 6-6 and belong to a region of illuminating light which has not been used in the prior art.

The region of y<−0.43x+0.60 is a result of adding a phosphor having peak emission wavelength in a region from 420 to 530 nm or a phosphor having peak emission wavelength in a region from 470 to 530 nm to the new high-efficiency light source which emits radiation in green and red bands, thereby determining the point where chromaticness diminishes, through a process of visual experiment.

In the experiment, as a typical sample of the new high-efficiency light source which emits radiation in green and red bands, such a light source was used as light from a fluorescent lamp coated with [chemical formula 1] $LaPO_4:Ce,Tb$ (LAP), which is commonly used as green light emitting phosphor, and a fluorescent lamp coated with [chemical formula 2] $Y_2O_3:Eu$, (YOX), which is commonly used as red light emitting phosphor, were blended. Then light from this light source was further blended with light from a fluorescent lamp coated with [chemical formula 3] $(Sr,Ca,Ba)_{10}(PO_4)_6Cl_2:Eu$ (SCA) which is commonly used as blue light emitting phosphor having peak emission wavelength in a range from 420 to 470 nm or light from a fluorescent lamp coated with [chemical formula 4] $Sr_4Al_{14}O_{25}:Eu$ (SAE) which is commonly used as blue-green light emitting phosphor having peak emission wavelength in a range from 470 to 530 nm, and a point where chromaticness diminished was determined by subjective evaluation.

Result of the experiment is shown in FIG. 6. Positions of light colors of these fluorescent lamps, which are coated with the phosphors individually, on the x-y chromaticity coordinate plane are also shown in the drawing: numeral 7 indicating LAP, 8 indicating YOX, 9 indicating SCA and 10 indicating SAE.

Values of x-y chromaticity coordinates of these light colors are as follows.

7 for LAP: x=0.332, y=0.540

8 for YOX: x=0.596, y=0.332

9 for SCA: x=0.156, y=0.079

10 for SAE: x=0.152, y=0.356

Point 11 in FIG. 6 is a plot of a point where chromaticness of the light source begins to diminish while blue light (chemical formula 3) is gradually blended with the light emitted by the sample of the new high-efficiency light source which is constituted so that flux ratio of green light [chemical formula 1] to red light [chemical formula 2] is LAP (green): YOX (red)=100:0. Point 12 is a plot of the result of the subjective evaluation experiment with blending ratio of LAP: YOX=95:5. Point 13 is a plot of the result of similar subjective evaluation experiment with blending ratio of LAP: YOX=90:10. Point 14 is a plot of the result of similar subjective evaluation experiment with blending ratio of LAP: YOX=85:15. Point 15 is a plot of the result of similar subjective evaluation experiment with blending ratio of LAP: YOX=80:20.

From the results 11 through 15, regression line of y=−0.43x+0.58 is obtained. However, because subjective evaluation involves variations, digit of the second decimal place of the y intercept was carried up so that all plots are included, thereby to give y<−0.43x+0.60 (equation 1).

Second embodiment of the invention where whiteness of the light emitted by the new high-efficiency light source is enhanced will be described in detail below.

Point 16 in FIG. 6 is a plot of a point where chromaticness of the light emitted by the lamp begins to diminish while blue-green light of a phosphor (chemical formula 4) is gradually blended with the light emitted by the sample which was constituted to have a flux ratio of LPA (green) :YOX (red)=80:20.

This result is also similar to that of the experiment described above where light emitted by the blue phosphor was blended, giving the relationship y<−0.43x+0.60. Thus it can be seen that major factor which determines the point where whiteness begins to be perceived in the blended light color is the chromaticity rather than the bandwidth of the blended light. And the equation (1) represents the border where the yellow-greenishness of the light of the new high-efficiency light source changes to blue-greenish light as the radiation in blue or blue-green band is enhanced, namely chromaticness begins to diminish as blue and yellow which are mutually opponent colors cancel each other.

The region of x>0.16 represents the tolerable limit for the intensity of chromaticness in the direction toward blue or blue-green. Points 9 and 10 of FIG. 6 represent the light colors of fluorescent lamps made by using the phosphors of [chemical formula 3] and [chemical formula 4] plotted on the chromatic diagram. The inequality x>0.16 is determined in consideration of the practical feasibility so that the chromaticities of the points 9 and 10 are not included.

Although increasing the radiation in blue or blue-green region improves the spectral luminous efficiency in scotopic vision and mesopic vision or wide view field under the same illuminance (same luminous flux), the increase of the radiation in these regions intrinsically leads to a decrease in the efficiency of the light source in terms of photometric quantity $V(\lambda)$. The increase of the radiation in these regions also causes the radiation in red region to relatively decrease, resulting in lower reproduction of red light color which is used for important signs such as the indication of danger.

Figure 7:
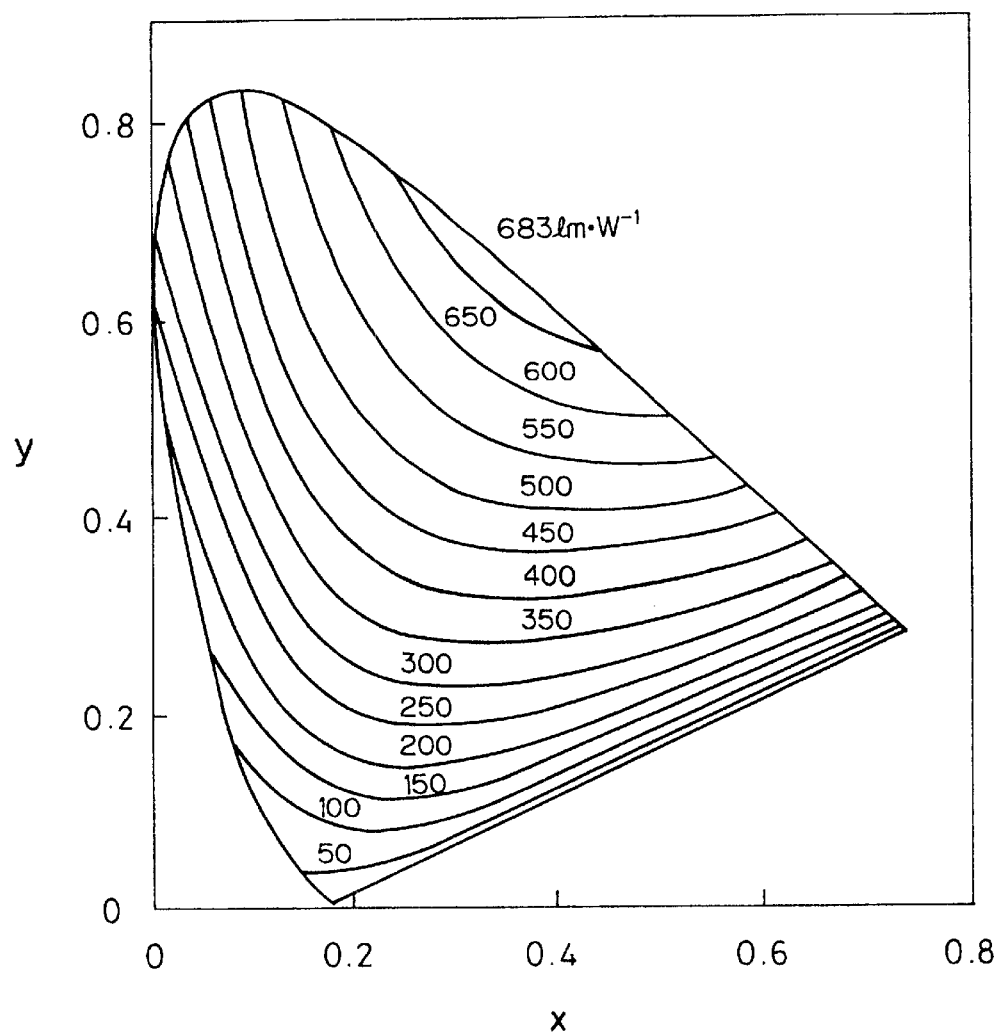
FIG. 7 shows the theoretical efficiency of light on x-y chromaticity coordinate plane.

Radiation intensity of light is related to the photometric quantity of illumination via $V(\lambda)$, while efficiency of mono-color having a wavelength of 555 nm at the peak of $V(\lambda)$ reaches the maximum of 683 lm/W. While efficiency of light of wavelengths other than 555 nm is lower than 683 lm/W, this relation is indicated in FIG. 7 where the theoretical efficiency of light is plotted on the x-y chromaticity coordinate plane.

Figure 8:
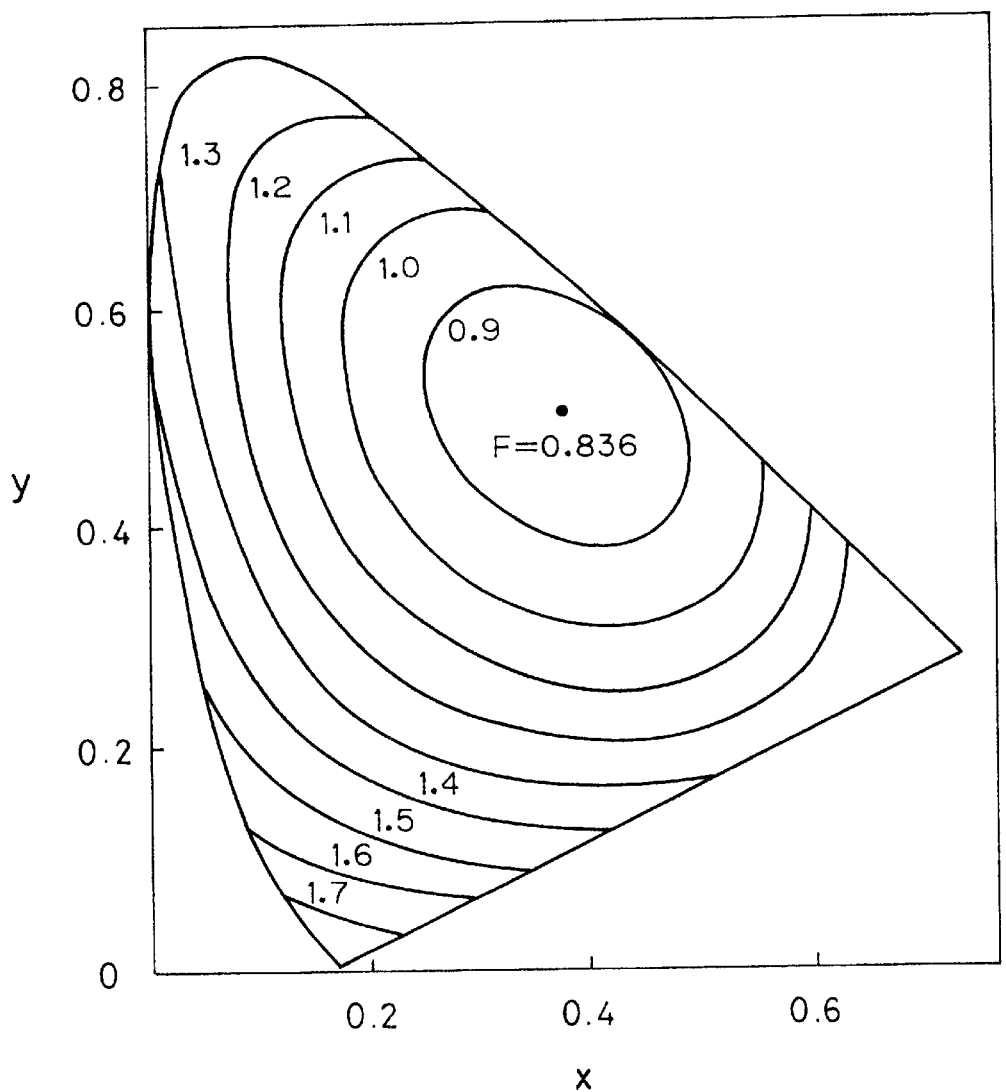
FIG. 8 shows the correction factor F of luminance on x-y chromaticity coordinate plane.

From this result, it can be seen that the theoretical efficiency of light decreases toward bottom right (blue or blue-green) on the x-y chromaticity coordinate plane. Although it would be expected that light of the same luminance is perceived to be of the same brightness regardless of whether it is white light or light colored in blue-green, chromatic light is felt to be brighter than white light in actuality. Denote the brightness perceived of chromatic light be B and luminance of chromatic light be L, then the ratio B/L of the chromatic light changes on the x-y chromaticity coordinate plane. Value of $\log(L)+F$ (F is a correction factor) corresponds to the brightness B, and the relation between the correction factor F of luminance and the position on the x-y chromaticity coordinate plane is represented by the correction factor F of luminance on the x-y chromaticity coordinate plane of FIG. 8. The correction factor F is supposedly required because Abney's law, which asserts that light fluxes having different spectra are additive, is not expected to hold strictly, and profile of $V(\lambda)$ which is the basis for the additiveness is not complete.

It can be seen that proportion of the correction increases toward bottom right (blue or blue-green) on the chromaticity coordinate plane. While this indicates the underestimation of $V(\lambda)$ in blue or blue-green region, the region of light colors on the x-y chromaticity coordinate plane of the invention covers the blue and blue-green light colors which have been theoretically underestimated.

Figure 9:
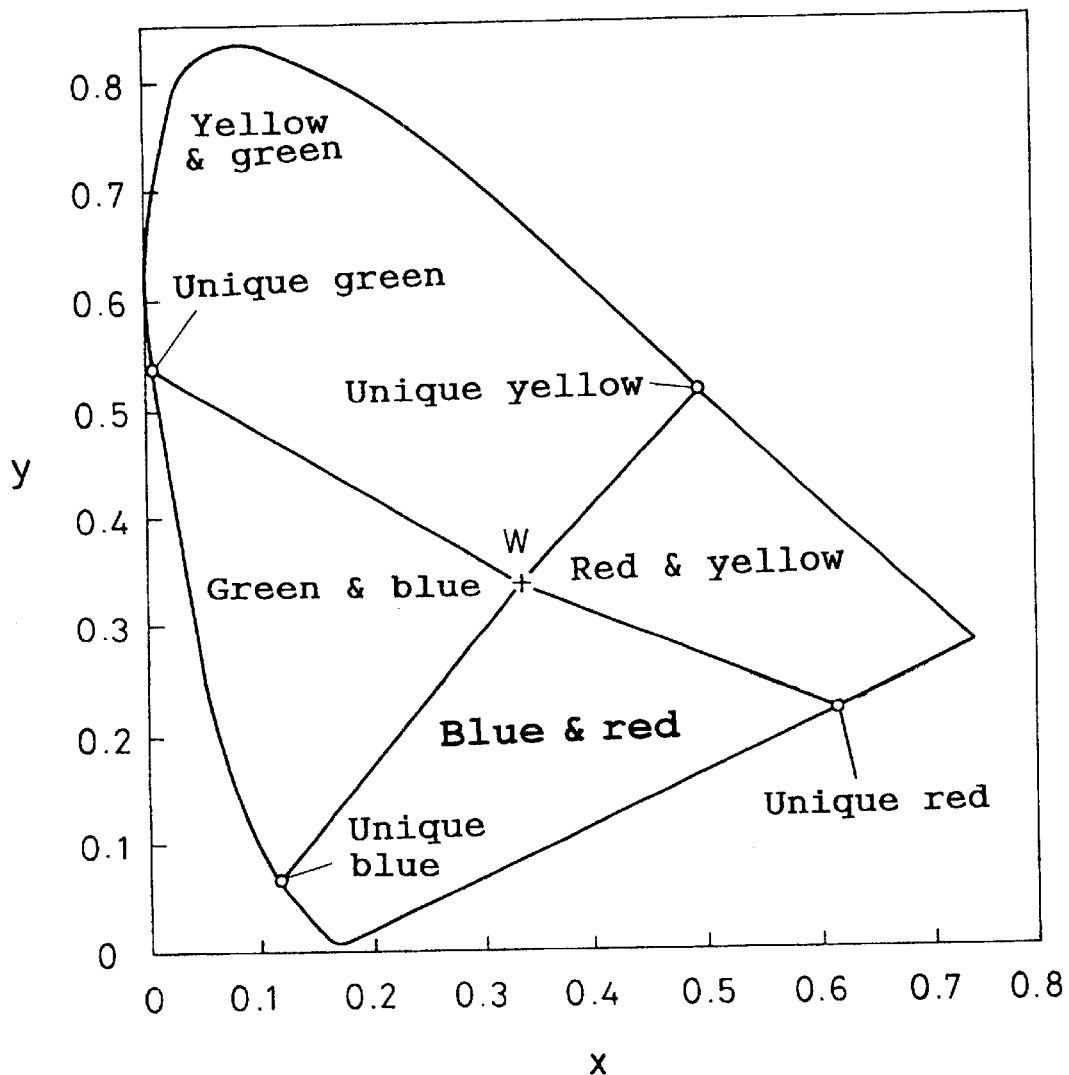
FIG. 9 shows points on spectral locus of unique colors.

FIG. 9 shows the positions of unique hues on the spectral locus. Unique hue refers to the light stimulus of wavelength which gives the color perception responsive to the stimuli of pure red, green, blue and yellow, when single spectrum only is extracted from wavelengths of light.

When light having an intermediate spectrum between the unique yellow and unique green is viewed, for example, both yellowishness and greenishness are perceived.

FIG. 9 shows the unique colors of red, green, blue and yellow connected with the equal-energy white color W by line segments.

In theory, light in the region defined by unique yellow, unique green and equal-energy white color W on the x-y chromaticity coordinate plane causes the perception of yellowishness and greenishness. As the spectrum departs from white and becomes nearer to Gaussian spectrum of edge of mono-color, the chromaticness thereof is intensified.

Theoretically speaking, opponent colors of yellowishness and bluishness compete with each other on the line (LN) connecting unique green and white, provided the color difference from white is the same.

The line LN is similar to the line of the subjective evaluation experiment (equation 1) described previously, and it is supposed that the result of the subjective evaluation is supported by such a theory as described above. It is thought that yellowishness and bluishness compete with each other when the rate of stimulus to the S cone cell exceeds a certain level with respect to the rate of stimulus to the M cone cell and the L cone cell.

As described above, a light source of high spectral luminous efficiency and mitigated intensity of chromaticness received from colored light can be made by applying the chromaticity range of the invention.

In this range, use of a range of colors which are near white and where perception of yellowish green is overridden by the perception of bluish green is particularly desirable, from the view point of spectral luminous efficiency and light color.

With this respect, the new high-efficiency light source modified to emit light of increased whiteness according to the second embodiment of the invention will be described in detail below.

When constituting the light source of the invention from fluorescent lamp, radiation energy emitted thereby can be concentrated in a specified wavelength band by using rare-earth phosphors.

In this embodiment, phosphors having peak wavelength for a region from 530 to 580 nm is a phosphor activated with terbium or terbium and cerium, a phosphor for a region from 600 to 650 nm is a phosphor activated with europium or europium or a manganese, a phosphor for a region from 420 to 530 nm and a phosphor for region from 470 to 530 nm are such phosphor activated with europium, or europium and manganese, or antimony, or manganese, or antimony and manganese.

More specifically, phosphors having peak wavelength band from 530 to 580nm is [chemical formula 1] $LaPO_4$:Ce, Tb, [chemical formula 5] $CeMgAl_{11}O_{19}$:Tb, [chemical formula 6] $(Ce,Gd)MgB_5O_{10}$:Tb or [chemical formula 7] $La_2O_3 \cdot 0.2SiO_2 \cdot 0.9P_2O_5$:Ce,Tb, phosphor from 600 to 650 nm is [chemical formula 2] $Y_2O_3$:Eu or [chemical formula 8] $(YGd)_2O_3$:Eu. These phosphors for generating main wavelength are as described in the foregoing application of PCT/JP96/02618(Light Source).

As examples of phosphors having peak emission wavelength in a band from 420 to 530 nm, there are phosphors which have peak wavelength in a region from 420 to 470 nm and are made of [chemical formula 9] $BaMgAl_{10}O_{17}$:Eu and [chemical formula 3] $(Sr,Ca,Ba)_{10}(PO_4)_6Cl_2$:Eu. While there are many phosphors of chemical compositions similar to these, [chemical formula 10] $(Sr,Ca,Ba,Mg)_{10}(PO_4)_6Cl_2$:Eu which includes Mg added thereto is included in the scope of the invention. And phosphors which have peak wavelength in a region from. 470 to 530 nm are [chemical formula 4] $Sr_4Al_{14}O_{25}$:Eu or [chemical formula 11] $Ce(Mg,Zn)Al_{11}O_{19}$:Mn.

Then radiation in a region from 420 to 530 nm can be achieved by making a phosphor layer comprising two phosphors which have peak emission wavelength in regions from 420 to 470 nm and from 470 to 530 nm, respectively. In this case, in addition to the improvements of luminous brightness in scotopic vision, mesopic vision and in wide field of view, perception of whiteness can be efficiently improved.

As another example of phosphor which radiates in the region from 420 to 530 nm, there is [chemical formula 12] $(Ba,Sr)MgAl_{10}O_{17}$:Eu,Mn. Scope of the invention also includes [chemical formula 13] $BaMgAl_{10}O_{17}$:Eu,Mn which does not include Sr. Increasing the concentration of activation component Eu causes the radiation in a region from 420 to 470 nm to increase, and increasing the concentration of activation component Mn achieves the radiation in a region from 470 to 530 nm.

In this case, because proportion of radiation in the region from 420 to 470 nm and that in the region from 470 to 530 nm can be set with a single phosphor, color tone can be set easily and color unevenness can be suppressed during manufacture of the lamp.

By making the phosphor having peak emission wavelength in a region from 530 to 580 nm from [chemical formula 14] $(Ce,Gd,Tb)(Mg,Mn)B_5O_{10}$ and making the phosphor having peak emission wavelength in a region from 600 to 650 nm from [chemical formula 15] $(Ce,Gd)(Mg,Mn)B_5O_{10}$, proportion of radiation in the region from 530 to 580 nm and that in the region from 600 to 650 nm can be set with a single phosphor by using the same base material for the phosphors, and therefore color tone can be set easily and color unevenness can be suppressed during manufacture of the lamp.

The fluorescent lamp of the invention can also be manufactured with a low cost when calcium halophosphate phosphor [chemical formula 16] $Ca_5(PO_4)_3(F,Cl)$:Sb,Mn is used for the phosphor having peak emission wavelength in a region from 420 to 530 nm. In this phosphor, because the activation agent Mn has peak of radiation in yellow region and the activation agent Sb has peak of radiation in blue-green region, light in blue-green region can be increased by increasing the concentration of the activation agent Mn. The claims of the invention includes a case where Mn is omitted and, in this case, single-peak radiation having blue-white light color is obtained.

Now the second embodiment of the invention will be described below.

The second embodiment of the invention is the new high-efficiency light source wherein chromaticity of the light color is decreased and whiteness is enhanced. According to the second embodiment of the invention, radiation in a region from 420 to 470 nm is increased thereby to decrease the chromaticity of the light color of the new high-efficiency light source and increase whiteness, while minimizing the increase in radiation in regions other than the dominant radiation wavelength bands from 530 to 580 nm and from 600 to 650. For this purpose, unlike the first embodiment of the invention, radiation is added to the blue region of wavelengths from 420 to 470 nm. Constitution of the phosphors is based on the first embodiment.

In this embodiment, light color of the light source can be greatly changed with a minimum addition of sub-emission, by increasing the radiation in shorter wavelength compared to the case of the first embodiment.

Specifically, subjective evaluation similar to that of the first embodiment of the invention was conducted as follows. As a sample of the new high-efficiency light source which emits radiation concentrated in green and red regions, such a light source was used which emits blended lights from a fluorescent lamp coated with [chemical formula 1] $LaPO_4$:Ce,Tb (LAP) which is commonly used as green light emitting phosphor and from a fluorescent lamp coated with [chemical formula 2] $Y_2O_3$:Eu, (YOX) which is commonly used as red light emitting phosphor. Then light emitted by this light source was further blended with light emitted by a fluorescent lamp coated with [chemical formula 3] $(Sr,Ca,Ba)_{10}(P_4)_6Cl_2$:Eu (SCA) which is commonly used as blue light emitting phosphor having peak emission wavelength in a range from 420 to 470 nm, and a point where chromaticness diminished and whiteness increased was determined by adjustment method.

In the subjective evaluation, subjects were four abult persons having normal color vision and three trials were made under one condition.

Flux ratio of green light emission [chemical formula 1] red light emission [chemical formula 2] in the sample of the new high-efficiency light source was changed in five steps from LAP (green):YOX (red)=100:0, LAP (green):YOX (red)=95:5, LAP (green):YOX (red)=90:10, LAP (green):YOX (red)=85:15 to LAP (green):YOX (red)=80:20. Chromaticity values x and y, calcium halophosphate phosphpor and Duv are shown in Table 1.

TABLE 1

Blended light with different proportions of LAP and YOX (5 variations)

| LAP:YOX (Flux ratio, %) | x | y | Correlated color temperature [K] | Duv |
|---|---|---|---|---|
| 100:0 | 0.3323 | 0.5397 | 5531 | 74.5 |
| 95:5 | 0.3552 | 0.5234 | 5096 | 62.9 |
| 90:10 | 0.3721 | 0.5083 | 4757 | 53.3 |
| 85:15 | 0.3934 | 0.4897 | 4311 | 41.3 |
| 80:20 | 0.4086 | 0.4792 | 3992 | 33.9 |

Results of the subjective evaluation are shown in Table 2.

TABLE 2

Experimental comparison of flux ratio, chromaticity values x & y, correlated color temperature and Duv of light sources when chromaticness diminishes and light begins to be perceived as white

| | LAP:YOX:SCA (Flux ratio, %) | x | y | Correlated color temperature [K] | Duv |
|---|---|---|---|---|---|
| Light source (1a) | 95.84:0.00:4.16 | 0.2966 | 0.4474 | 6494 | 59 |
| Light source (1b) | 91.60:4.57:3.84 | 0.3162 | 0.4439 | 5953 | 50 |
| Light source (1c) | 87.51:8.68:3.81 | 0.3304 | 0.4339 | 5576 | 41 |
| Light source (1d) | 82.78:13.91:3.31 | 0.3506 | 0.4314 | 5041 | 33 |
| Light source (1e) | 78.90:17.66:3.44 | 0.3615 | 0.4174 | 4722 | 24 |

Table 2 shows the mean value of flux ratio (%) of LAP:YOX:SCA which causes the subjects to begin to feel that chromaticity has decreased and the light has become whitish, in terms of flux ratio. The light sources are denoted as 1a through 1e, and chromaticity values x and y, calcium halophosphate phosphpor and Duv at this time are shown.

Figure 10:
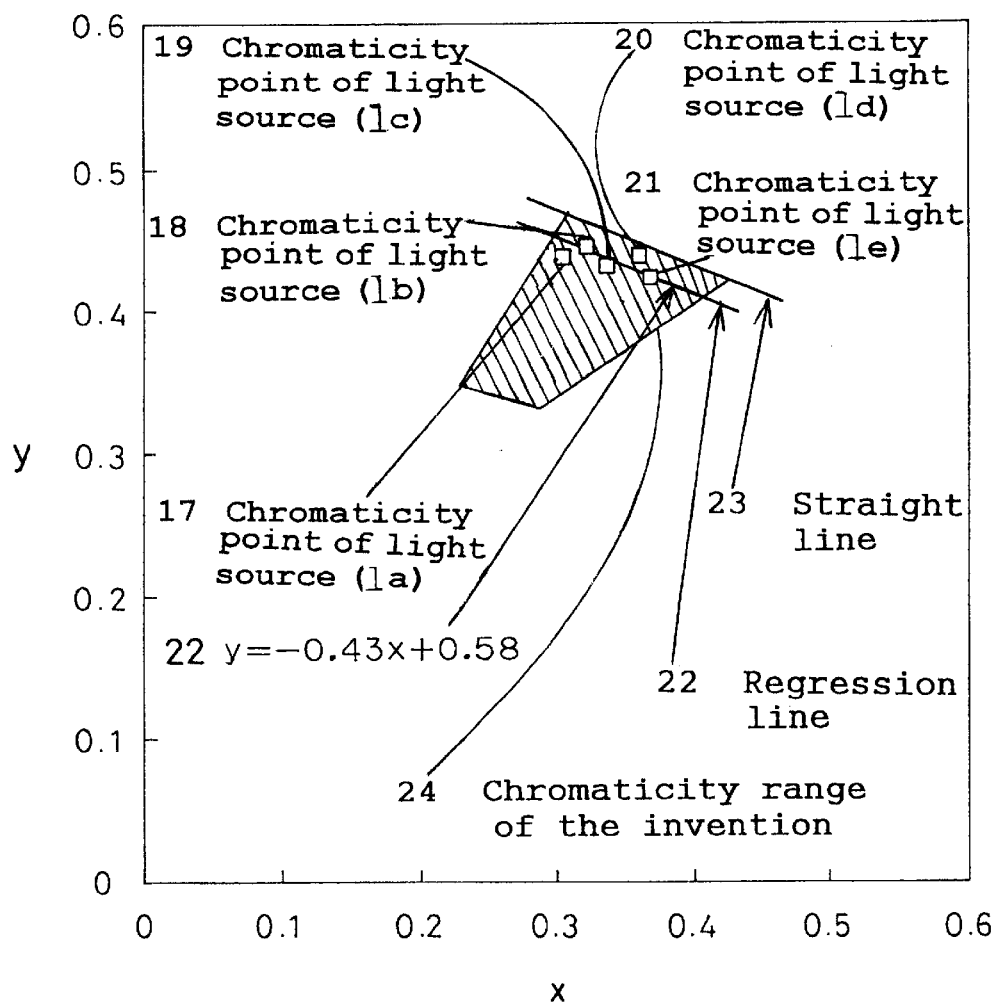
FIG. 10 shows chromaticity values x, y of light sources 17 (la) through 21 (le) and regression line 22 (y=−0.43x+0.58) thereof on x-y chromaticity coordinate plane.

FIG. 10 shows chromaticity values x and y of the light sources 17 (1a) through light sources 21 (1e) and regression line 22 thereof (y=−0.43x+0.58). Straight line 23 shown in this drawing is a parallel displacement of the regression line with the digit at the second decimal place of the y intercept of the line being carried up, so that all chromaticity values x and y of the light sources (1a) through (1e) are included. Hatched area 24 represents the range of claims 13 and 14.

Figure 11:
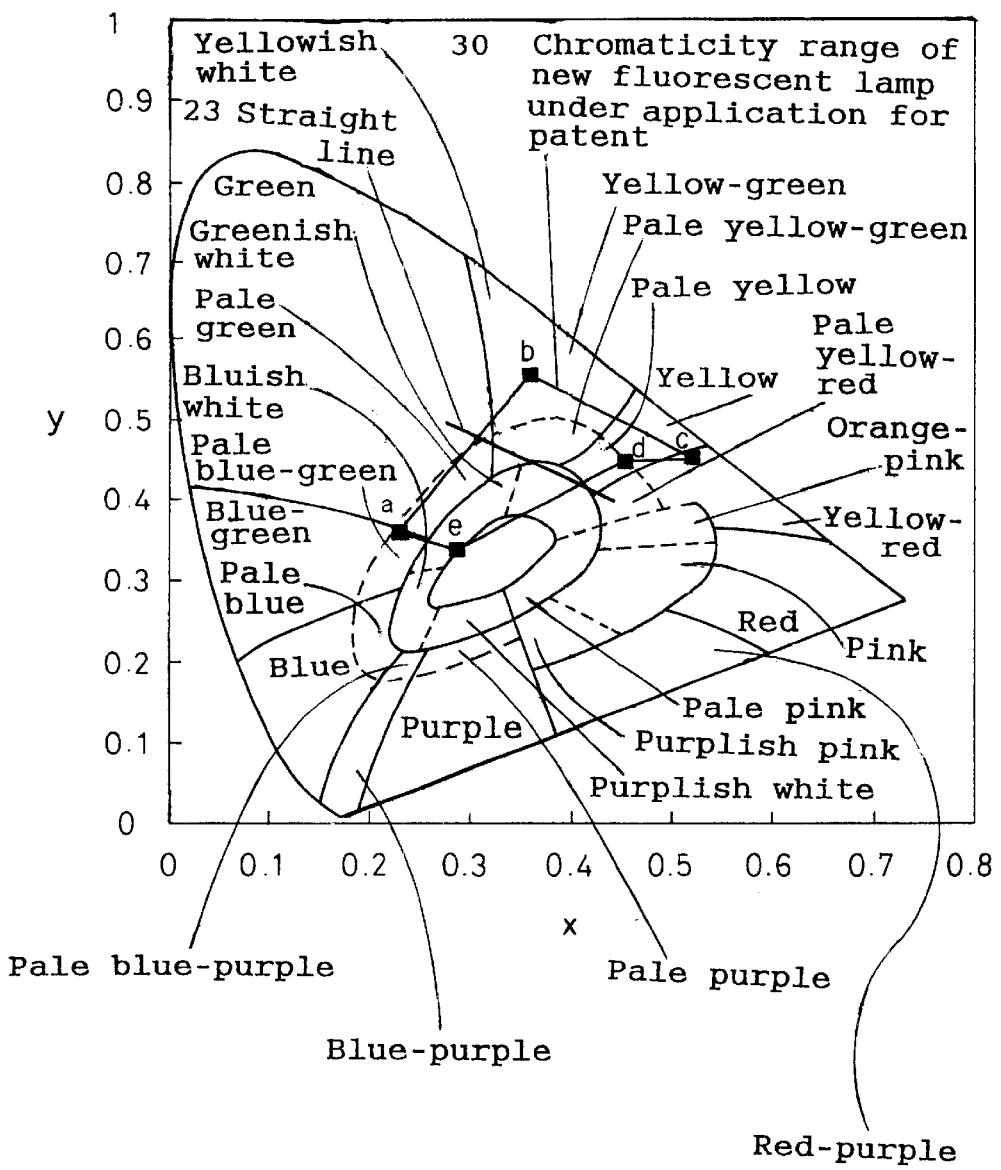
FIG. 11 shows the relation between chromaticity values (x, y)=a: (0.228, 0.351), b: (0.358, 0.551), c: (0.525, 0.440), d: (0.453, 0.440, e: (0.285, 0.332), straight line 23 (y<−0.43x+0.60) and color names of the light source in the case of certain aspect of the invention.
Figure 12:
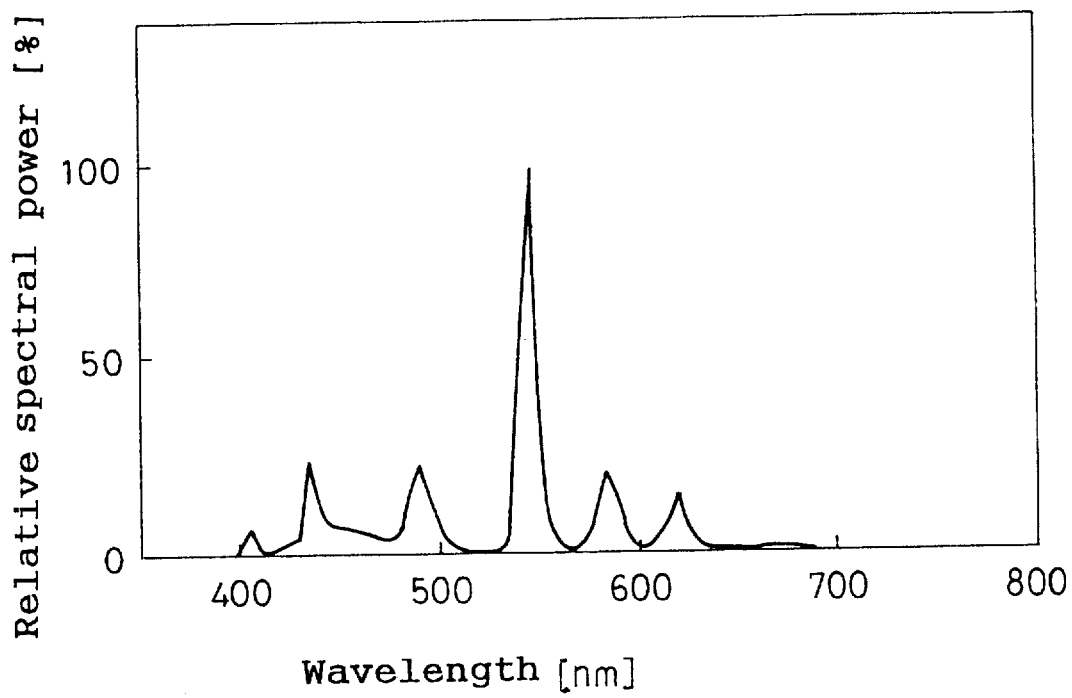
FIG. 12 through FIG. 16 show the spectral distributions of light sources (lf) through (lj) which ar constitutede from 20 W fluorescent lamps.
Figure 13:
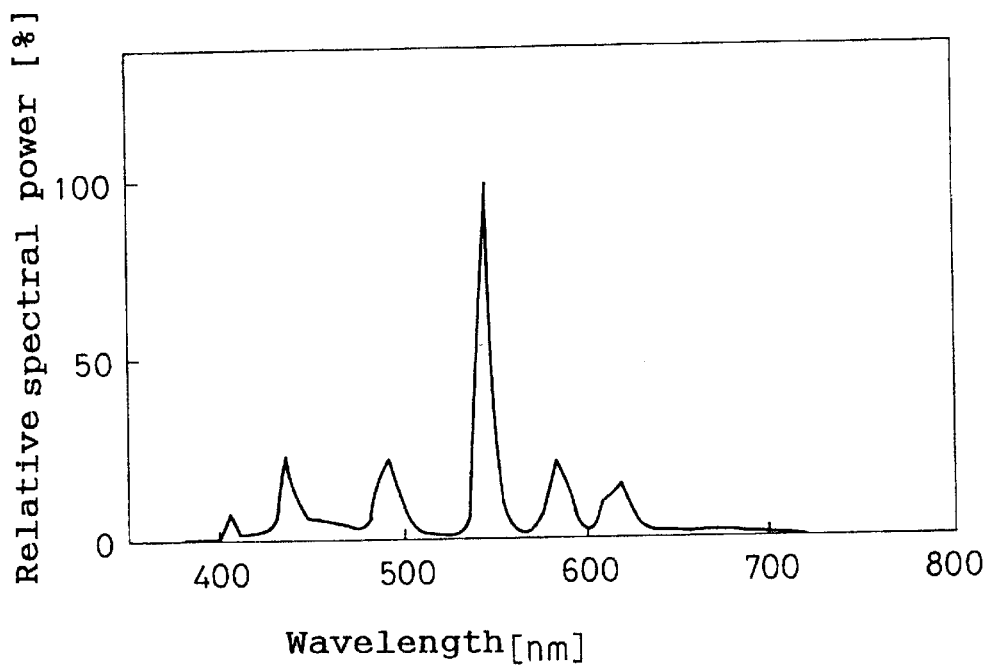
Figure 14:
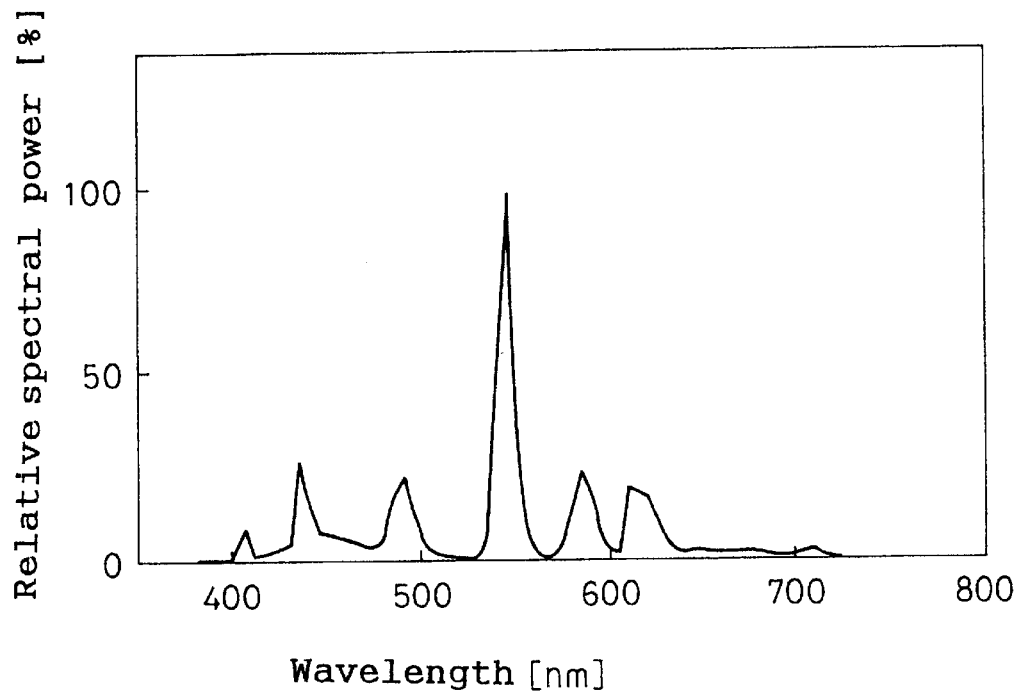
Figure 15:
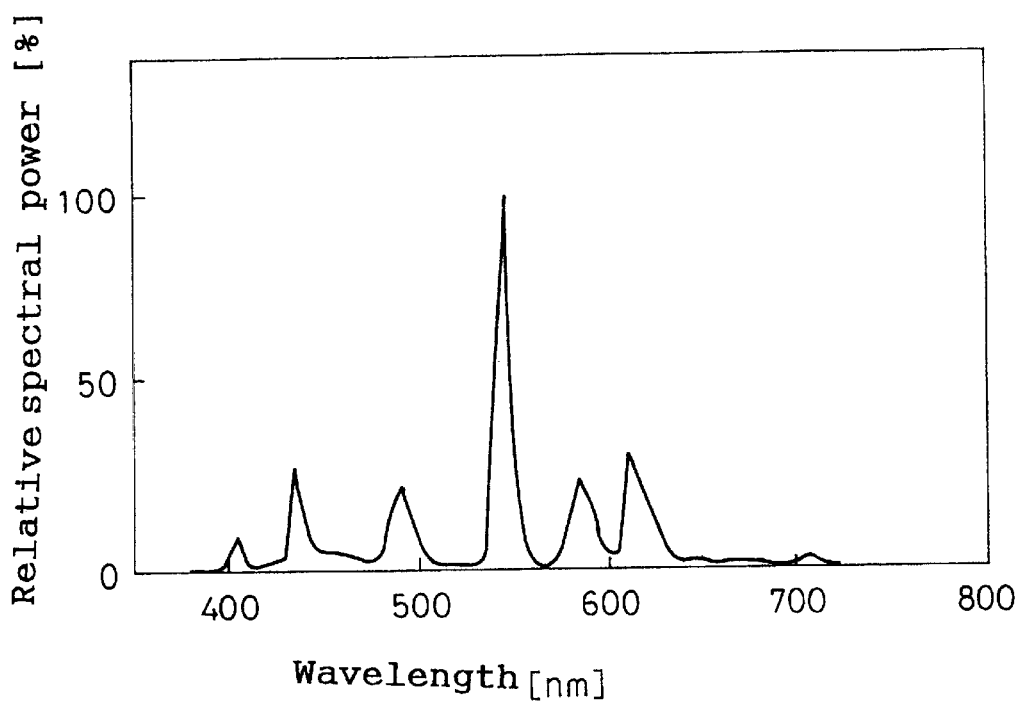
Figure 16:
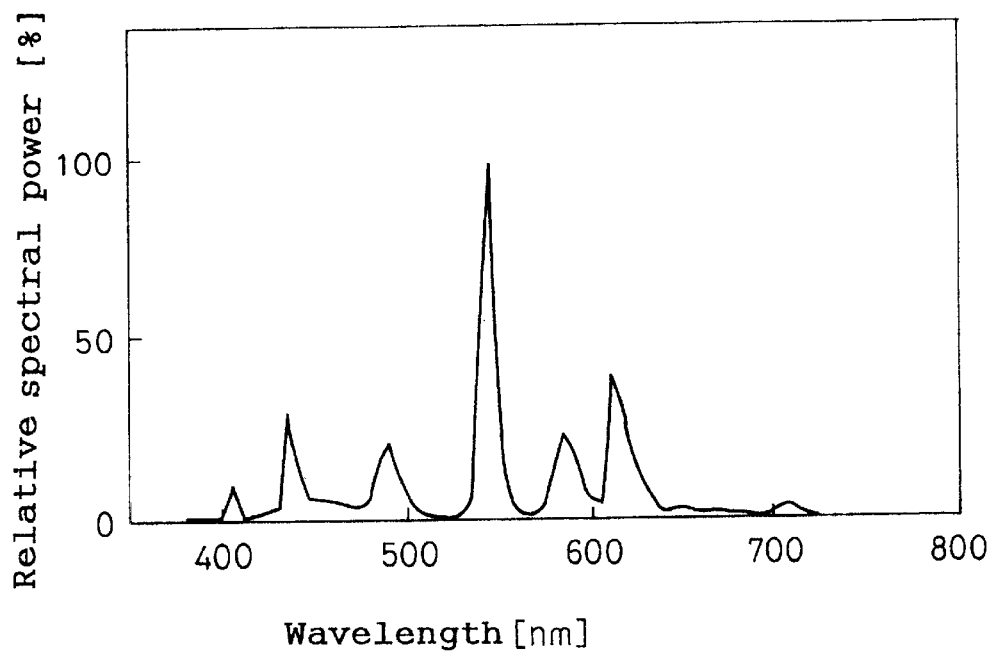

FIG. 11 shows the chromaticity values (x, y) of claims 13 and 14, a: (0.228, 0.351), b: (0.358, 0.551), c: (0.525, 0.440), d: (0.453, 0.440) and e: (0.285, 0.332), for comparison, and the relation between the line 23 (y<−0.43x+0.60) and the color names of light emitted by the light source. A fluorescent lamp which emits light of less chromaticity and white impression can be made by setting the condition of the fluorescent lamp of the invention under the line of y=−0.43x+0.60.

Weight proportions of LAP, YOX, and SCA phosphors, chromaticity values x % y, halophosphate phosphor and Duv of light sources which correspond to the light sources (1a) through (1e) of Table 2 made as prototypes by using 20 fluorescent lamps are shown as light sources 1f through 1j in Table 3.

TABLE 3

Comparison of blending ratio, chromaticity values x & y, correlated color temperature and Duv of various 20 W fluorescent lamps when chromaticness diminishes and light begins to be perceived as whiteness

| | LAP:YOX:SCA (Blending ratio, %) | x | y | Correlated color temperature [K] | Duv |
|---|---|---|---|---|---|
| Light source (1f) | 76.93:6.49:16.58 | 0.3004 | 0.4380 | 6419 | 54.5 |
| Light source (1g) | 69.05:17.97:12.98 | 0.3177 | 0.4451 | 5911 | 50.3 |
| Light source (1h) | 61.43:27.24:11.33 | 0.3320 | 0.4307 | 5530 | 39.6 |
| Light source (1i) | 51.29:41.95:6.76 | 0.3568 | 0.4388 | 4906 | 33.9 |
| Light source (1j) | 48.70:43.29:8.01 | 0.3656 | 0.4233 | 4641 | 24.9 |

FIG. 12 through FIG. 16 show the spectral distributions of light sources 1f through 1j which are the embodiments of the invention by means of 20 W fluorescent lamps.

Figure 17:
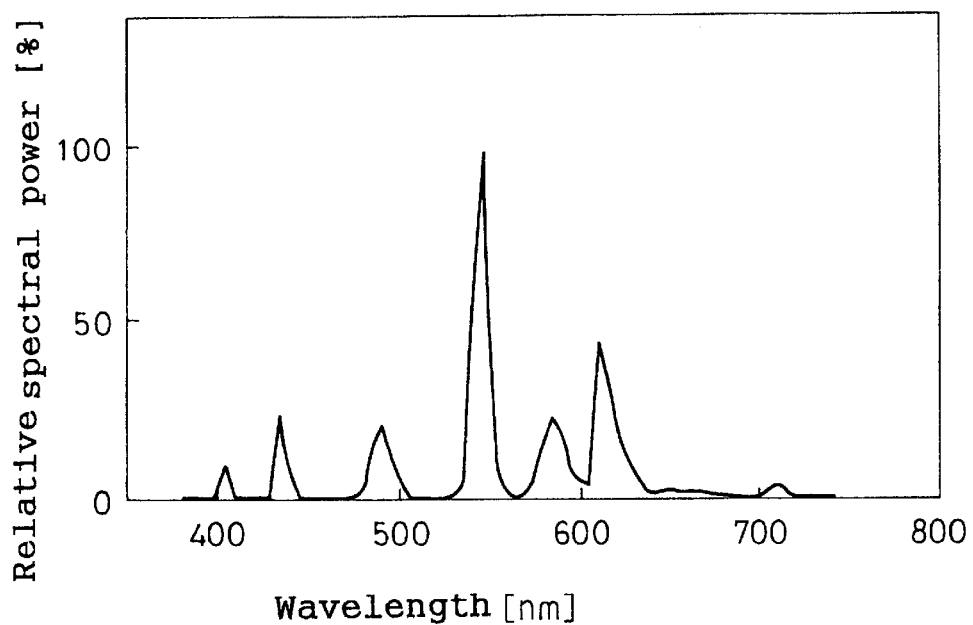
FIG. 17 shows the spectral characteristic when the new high-efficiency light source is realized by the fluorescent lamp.

In these spectral distributions, in comparison to the embodiment where the new high-efficiency light source having the spectral distribution shown in FIG. 17 is made by using the fluorescent lamps, relative spectral power generated by the phosphor which has the peak emission wavelength in a wavelength band from 420 to 470 nm exists, and chromaticness can be decreased and whiteness can be increased in the light color of the new fluorescent lamp by adding radiation in this wavelength band.

Also it is made possible to improve the luminous brightness in scotopic vision, mesopic vision and in wide field of view, as well as improve the whiteness.

TABLE 4

Flux ratios (%) of light sources (i) through (m) consisting of only LAP and SCA determined from experiments

| | Flux ratio of LAP (%) | Flux ratio of SCA (%) |
|---|---|---|
| Light source (1a) | 95.84 | 4.16 |
| Light source (1b) | 95.98 | 4.02 |
| Light source (1c) | 95.83 | 4.17 |
| Light source (1d) | 96.16 | 3.84 |
| Light source (1e) | 95.82 | 4.18 |
| Average | 95.92 | 4.08 |

Table 4 shows the blending ratio of only the LAP and SCA of the light sources 1a through 1e in terms of flux ratio, based on the blending ratio in terms of flux ratio of the three fluorescent lamps which have the three kinds of single phosphors shown in Table 2.

It is shown that the blending ratio (%) of LAP and SCA is 96:4 in almost every light source. The chromaticity point (0.285, 0.332) of the chromaticity range of the invention is located farthest toward blue region, and therefore blending ratio of SCA is maximum at this point.

Flux ratio (%) of LAP, YOX and SCA at this chromaticity point is 81:9:10 when calculated from the chromaticity values of the monochromatic fluorescent lamps which have the three kinds of single phosphors for color blending, by the equation of additive color blending. The flux ratio becomes 89:11 in the case of LAP and SCA.

Thus when light generated by a phosphor as like SCA having peak emission wavelength in a range from 420 to 470 nm and a phosphor as like LAP having peak emission wavelength in a range from 530 to 580 nm are blended in a flux ratio (%) of B:G where B is from 4 to 11 (%) and G is from 96 to 89 (%), a fluorescent lamp having whiteness with less chromaticness in the light can be made.

In the range of chromaticity of the invention, the color point where the flux ratio (%) of YOX becomes maximum is the intersection of the lines y=−0.43x+0.60 and y=0.15+0.64x. Flux ratio (%) of LAP, YOX and SCA at this intersection is, when calculated by the equation of additive color blending, 70:28:2. Based on this finding, a light color having a whiteness with less chromaticness in the light can be made with obtaining categorical color perception with a high efficiency by blending the flux R emitted by a phosphor which has peak emission wavelength in a range from 600 to 650 nm such as YOX and sum of B+G of flux emitted by a phosphor which has peak emission wavelength in a range from 420 to 470 nm such as SCA and flux emitted by a phosphor which has peak emission wavelength in a range from 530 to 580 nm such as LAP in a ratio of R: B+G where R is set within a range from 0 to 28(%) and B+G within a range from 100 to 72 (%).

Figure 18:
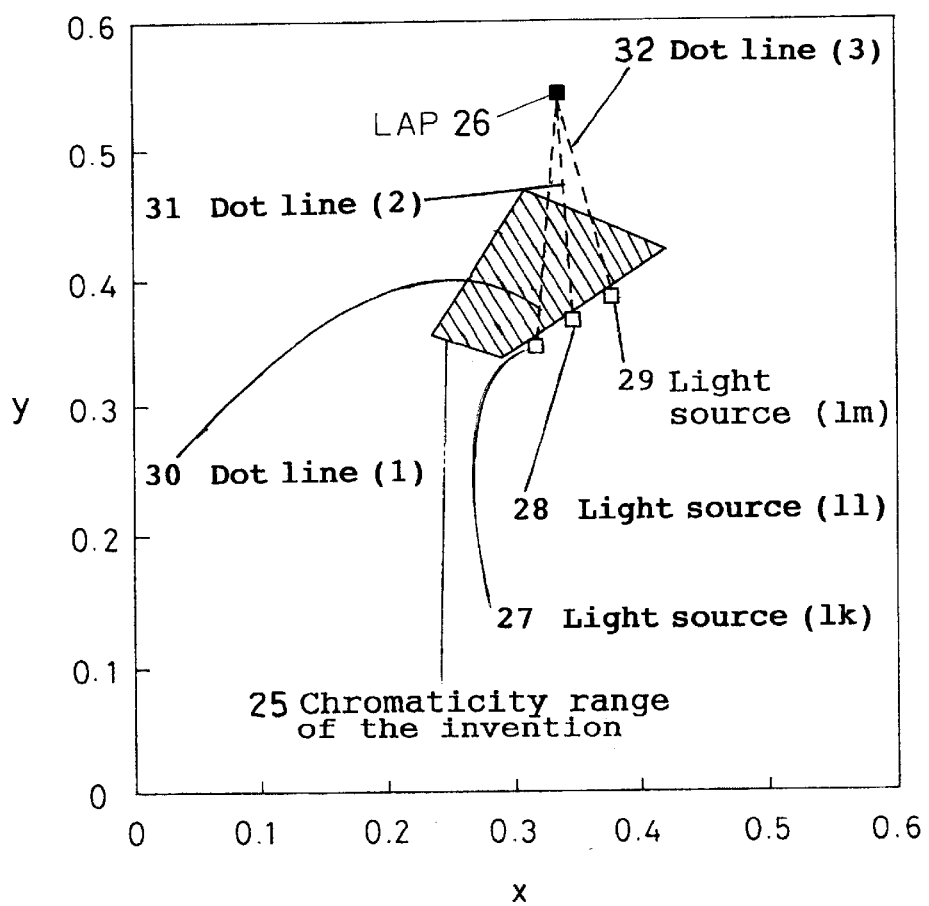
FIG. 18 shows the chromaticity range 25 defined by the chromaticity values (x, y)=a: (0.228, 0.351), b: (0.358, 0.551), c: (0.525, 0.440), d: (0.453, 0.440), e: (0.285, 0.332), (y<−0.43x+0.60) on chromaticity coordinate plane in the case of claims 13 and 14 of the invention.
Figure 19:
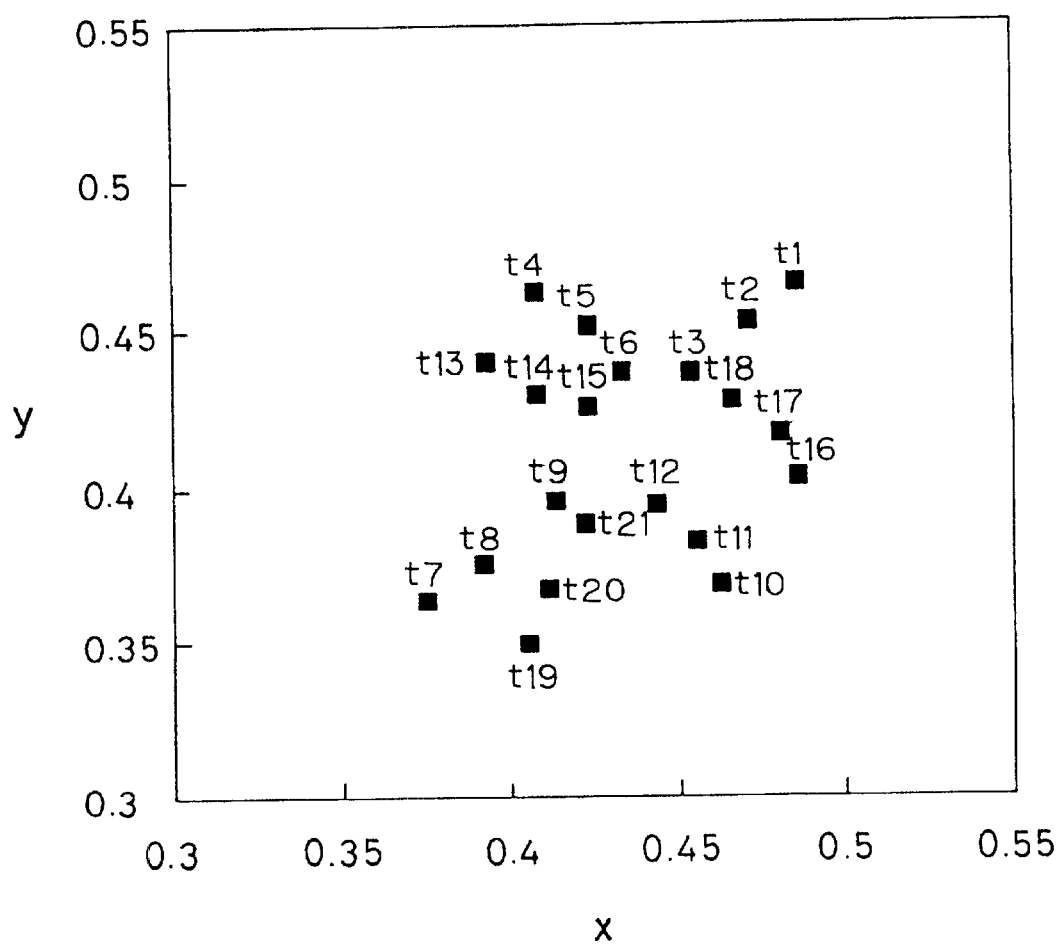
FIG. 19 shows 21 light colors of t1 through t21 on x-y color point coordinate.

FIG. 18 shows the chromaticity range 25 of claims 13 and 14 of the invention being defined by the chromaticity values (x,y) a: (0.228, 0.351), b: (0.358, 0.551), c: (0.525, 0.440), d: (0.453, 0.440) and e: (0.285, 0.332) and y<−0.43x+0.60, fluorescent lamp 26 having the single phosphor of LAP, chromaticity values x & y of the light source (lk) 27 coated with halophosphate phosphor of daylight color, chromaticity values x & y of the light source (ll) 28 coated with halophosphate phosphor of neutral white color, and chromaticity values x & y of the light source (lm) 29 coated with halophosphate phosphor of white color being plotted on the x-y chromaticity coordinate plane. By blending the light source 26 and one of the light sources lk 27 through lm 29, and light sources having chromaticity x, y of dashed lines (1) 30, (2) 31 and (3) 32, it is made possible to realize the light source having the chromaticity range 25 of the invention.

Table 5 compares the lamp efficiencies of the light sources lf through lj employing 20 W fluorescent lamps, the new fluorescent lamp having the spectral characteristic shown in FIG. 11, the conventional white fluorescent lamp employing halophosphate phosphor and a three band radiation type daylight fluorescent lamp.

TABLE 5

Lamp efficiencies of various light sources (20 W)

| Type of lamp | Lamp efficiency (1 m/W) |
| --- | --- |
| Light source (1f) | 106.0 |
| Light source (1g) | 101.5 |

TABLE 5-continued

Lamp efficiencies of various light sources (20 W)

| Type of lamp | Lamp efficiency (1 m/W) |
| --- | --- |
| Light source (1h) | 97.6 |
| Light source (1i) | 96.3 |
| Light source (1j) | 91.4 |
| New high-efficiency light source | 96.9 |
| White fluorescent lamp (Halophosphate phoshor) | 73.9 |
| White daylight fluorescent lamp (Three band radiation type) | 78.7 |

Lamp efficiencies of the light sources lf through lj are about 24 to 43% higher than those of the conventional white fluorescent lamp which uses halophosphate phosphor and about 10 to 35% higher than that of the conventional three band radiation type daylight fluorescent lamp. Now the third embodiment of the invention will be described below.

The third embodiment of the invention renders incandescent color to the light of the new high-efficiency light source. Specific configuration of the phosphor is similar to that of the first embodiment.

The embodiment of the invention is based on experimental data obtained through subjective evaluation of light sources whether light color thereof is acceptable or not as incandescent lamp light color.

In this experiment, two lighting areas each having dimension of 2° in terms of the angle of view were presented at the same time, one as a test stimulus and the other as a reference stimulus in dark field of view.

The test stimulus was designed to be able to randomly present 21 kinds of light colors t1 through t21. Each test stimulus was produced by adjusting the ratio of blending the fluorescent lamp (LAP) characterized by the green light of [chemical formula 1] $LaPO_4:Ce,Tb$, the fluorescent lamp (YOX) characterized by the red light of [chemical formula 2] $Y_2O_3:Eu$, the fluorescent lamp (SCA) characterized by the blue light of [chemical formula 3] $(Sr,Ca,Ba)_{10}(PO_4)_6Cl_2:Eu$ and a fluorescent lamp emitting pure yellow light having peak emission wavelength of 580 nm and chromaticity values x, y of (0.515, 0.472). Properties of the test stimuli are shown in Table 6.

TABLE 6

Chromaticity values x, y, correlated color temperature and Duv of test stimuli t1 through t21 1.

| Test stimulus No. | x | y | Tc(K) | Duv |
| --- | --- | --- | --- | --- |
| t1 | 0.4860 | 0.4620 | 2731 | 15.6 |
| t2 | 0.4714 | 0.4501 | 2834 | 12.9 |
| t3 | 0.4538 | 0.4339 | 2964 | 9.2 |
| t4 | 0.4077 | 0.4607 | 3915 | 27.5 |
| t5 | 0.4232 | 0.4497 | 3571 | 20.0 |
| t6 | 0.4336 | 0.4352 | 3295 | 12.6 |
| t7 | 0.3756 | 0.3626 | 4030 | −5.4 |
| t8 | 0.3927 | 0.3742 | 3657 | −4.6 |
| t9 | 0.4143 | 0.3948 | 3344 | −0.1 |
| t10 | 0.4626 | 0.3665 | 2310 | −16.7 |
| t11 | 0.4559 | 0.3812 | 2518 | −10.8 |
| t12 | 0.4438 | 0.3931 | 2798 | −5.2 |
| t14 | 0.3942 | 0.4385 | 4062 | 22.6 |

TABLE 6-continued

Chromaticity values x, y, correlated color temperature and Duv of test stimuli t1 through t21 1.

| Test stimulus No. | x | y | Tc(K) | Duv |
|---|---|---|---|---|
| t14 | 0.4090 | 0.4285 | 3701 | 15.0 |
| t15 | 0.4239 | 0.4244 | 3389 | 10.2 |
| t16 | 0.4869 | 0.4018 | 2299 | −4.4 |
| t17 | 0.4810 | 0.4155 | 2466 | 0.5 |
| t18 | 0.4666 | 0.4258 | 2724 | 4.9 |
| t19 | 0.4062 | 0.3475 | 3074 | −20.1 |
| t20 | 0.4127 | 0.3656 | 3115 | −12.7 |
| t21 | 0.4230 | 0.3875 | 3110 | −4.8 |

As the reference stimulus, an incandescent lamp light color (correlated color temperature 2800 K and chromaticity values x, y (0.452, 0.406) was presented.

In the experiment, test stimuli were presented randomly to subjects who were asked to compare the test stimuli with the reference stimulus and determine whether the light color of the test stimulus is acceptable as incandescent lamp light color or not.

Evaluation was repeated three times under the same condition by seven subjects having normal color vision. While the light emitting area was shown at two levels of luminance, 3000 cd/cm$^2$ and 300 cd/cm$^2$, result of the experiment showed no difference in the evaluation of the light color between the two levels of luminance.

Figure 20:
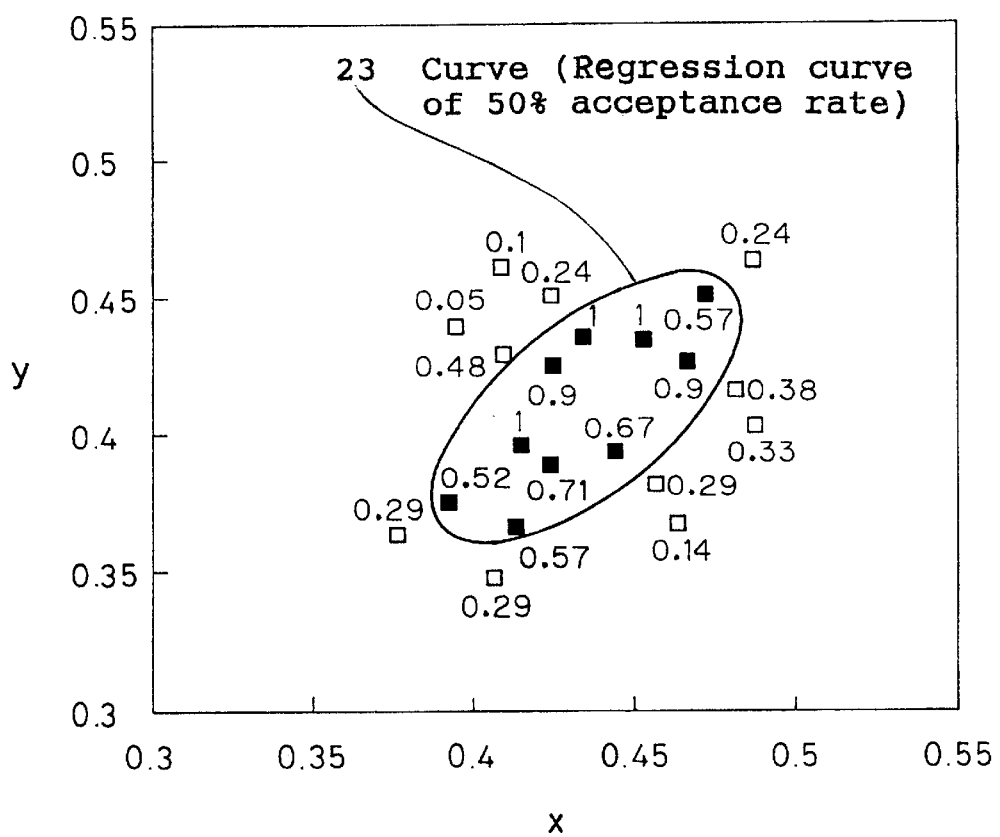
FIG. 20 shows the acceptance rate of each test light source as incandescent lamp type color with the chromaticity point (x, y) thereof.

FIG. 20 shows the acceptance rates of the test light sources as incandescent color with decimal point form every chromaticity point (x, y) thereof. Curve 23 is the regression curve of 50% acceptance rate. That is, the area within the curve 23 represents the range of light color accepted as incandescent color by at least half of the subjects.

Figure 21:
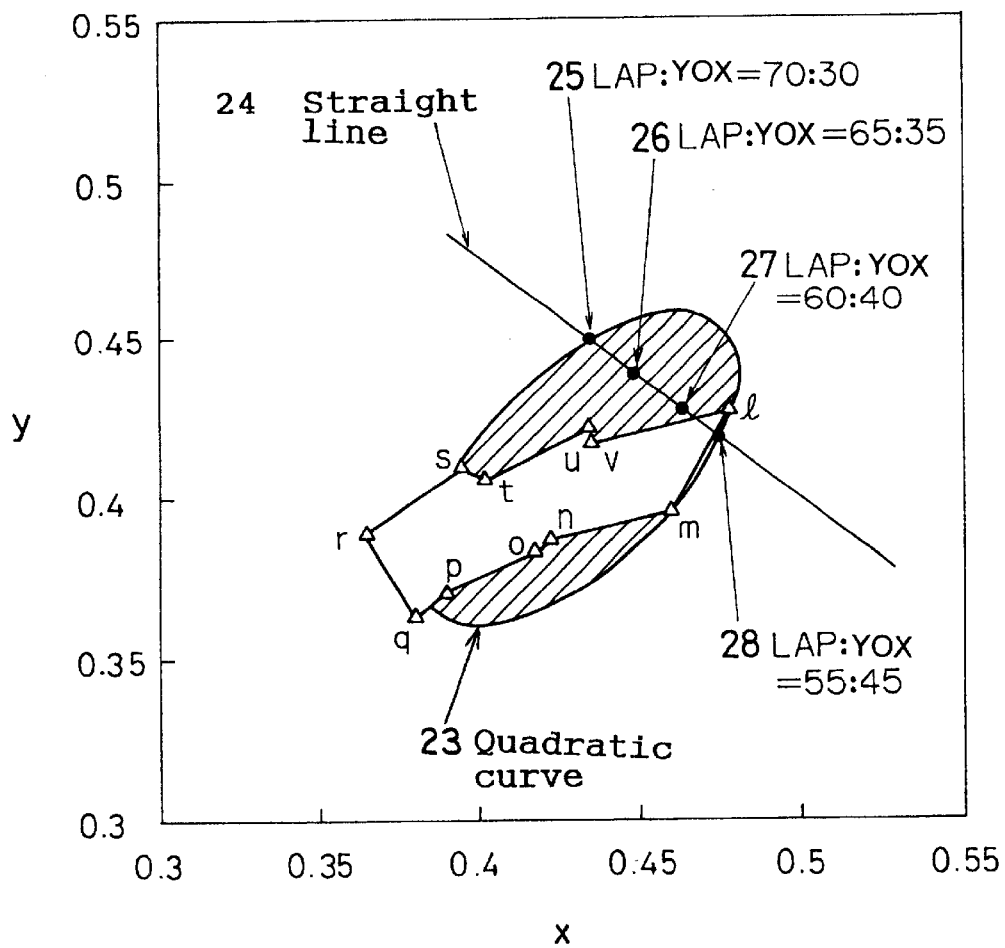
FIG. 21 shows the relation between points l through v of claim 21 of the invention and the curve 23.

FIG. 21 shows the relation between the area defined by l to v range enclosed by line segments connecting the chromaticity points l: (0.4775, 0.4283), m: (0.4594, 0.3971), n: (0.4214, 0.3887), o: (0.4171, 0.3846), p: (0.3903, 0.3719), q: (0.3805, 0.3642), r: (0.3656, 0.3905), s: (0.3938, 0.4097), t: (0.4021, 0.4076), u: (0.4341, 0.4233) and v: (0.4348, 0.4185) of claim 21 of the invention and the curve 23.

The area defined by l to v represents the range of light colors of the conventional lamp obtained by the JIS method wherein upper and lower delimiting lines are set in the vicinity of the Planckian locus and specifying the inside thereof as tolerable range. The chromaticity for fluorescent lamps specified by IEC is included in this range. Claim 22 of the invention is the range which is left when the area defined by l to v is subtracted from the inside of the curve 23.

The straight line 24 shows the change in chromaticity when the flux ratio of LAP:YOX is changed in a fluorescent lamp made by using only the LAP phosphor having peak emission wavelength in a region from 530 to 580 nm and the YOX phosphor having peak emission wavelength in a region from 600 to 650 nm.

Point 25 represents the chromaticity in the case of LAP:YOX=70:30, where the correlated color temperature is about 3500 K and Duv is about 19, while point 26 represents the chromaticity in the case of LAP:YOX=65:35, where the correlated color temperature is about 3100 K and Duv is about 12, point 27 represents the chromaticity in the case of LAP:YOX=60:40, where the correlated color temperature is about 2800 K and Duv is about 6, and point 28 represents the chromaticity in the case of LAP:YOX=55:45, where the correlated color temperature is about 2600 K and Duv is about 1.

Thus it is shown that, for a fluorescent lamp having dominant radiation wavelengths in a region from 530 to 580 nm and in a region from 600 to 650 nm, correlated color temperature of about 3500 K determines the borderline between incandescent light color and white light color when correlated color temperature is used as an index.

Figure 22:
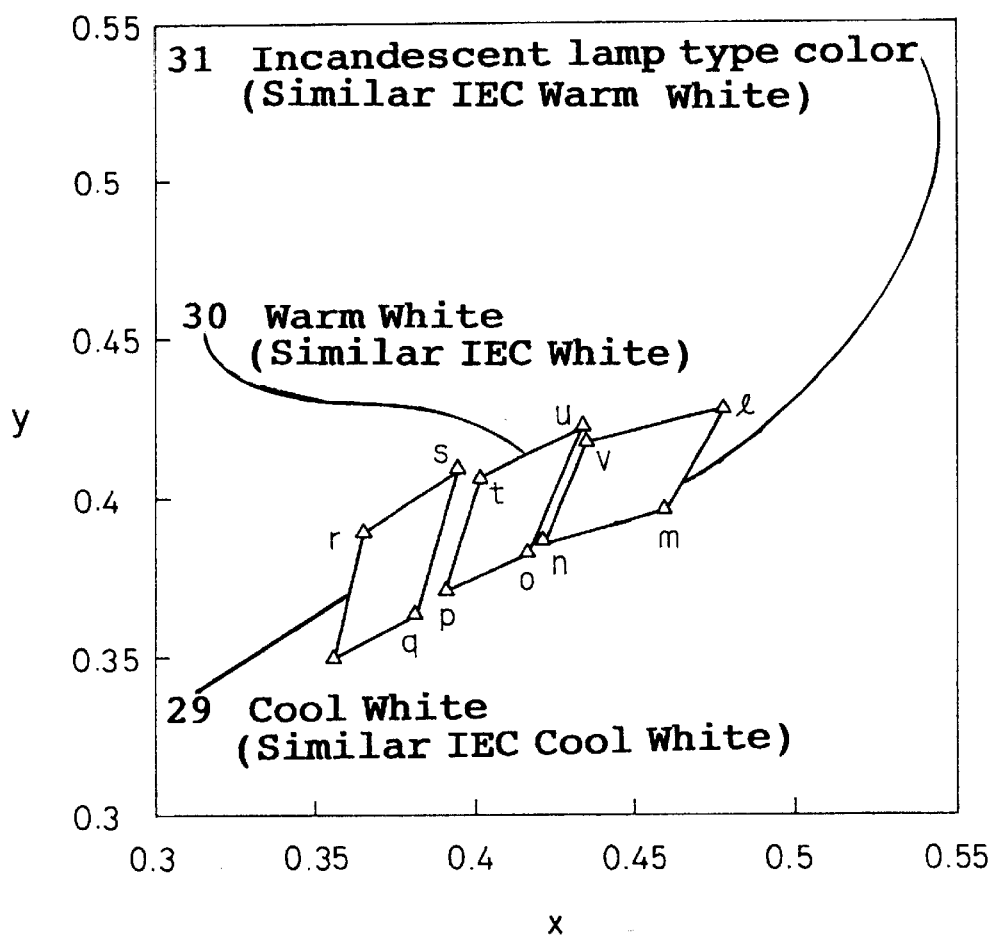
FIG. 22 shows the range of the light colors of fluorescent lamps qualified by JIS used as reference.
Figure 23:
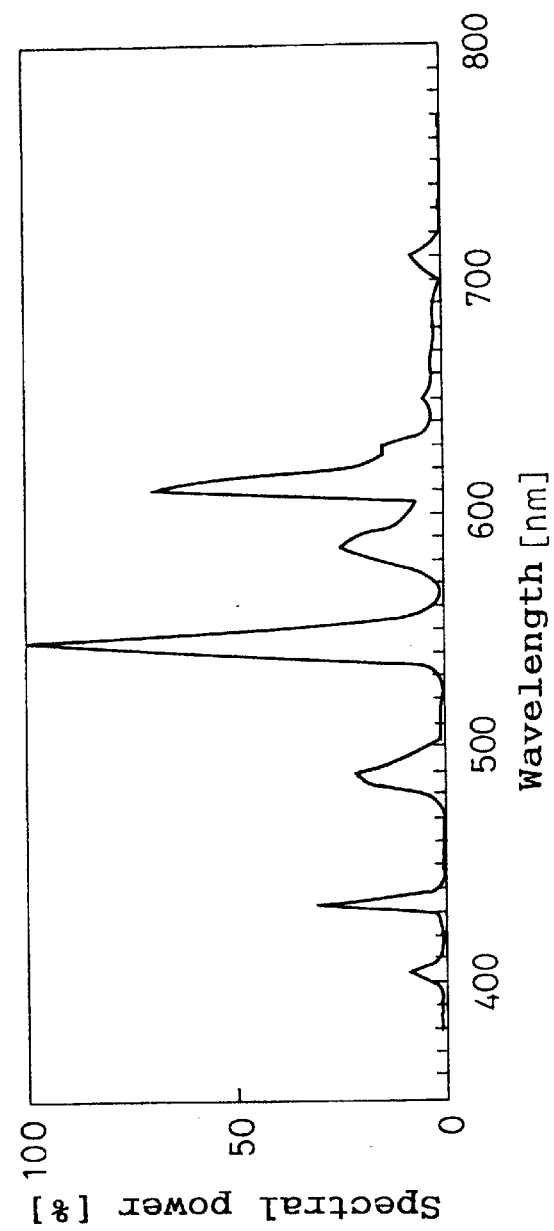
FIG. 23 through FIG. 26 show the spectral distribution of an embodiment with fluorescent lamp when flux ratio LAP:YOX is varied.
Figure 24:
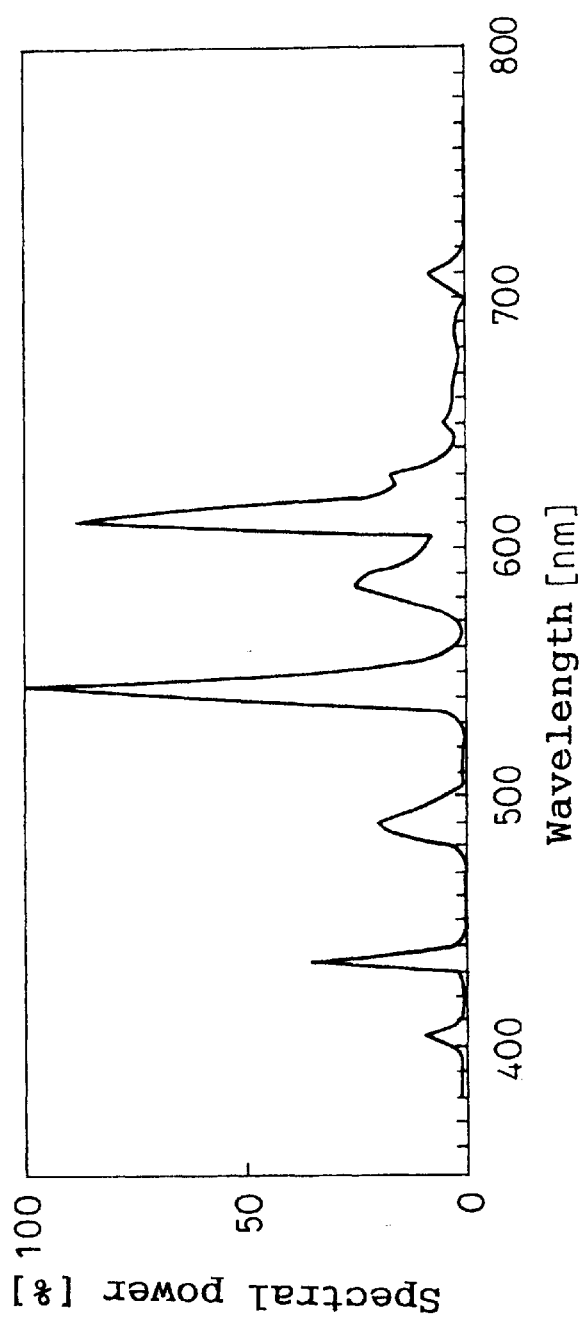
Figure 25:
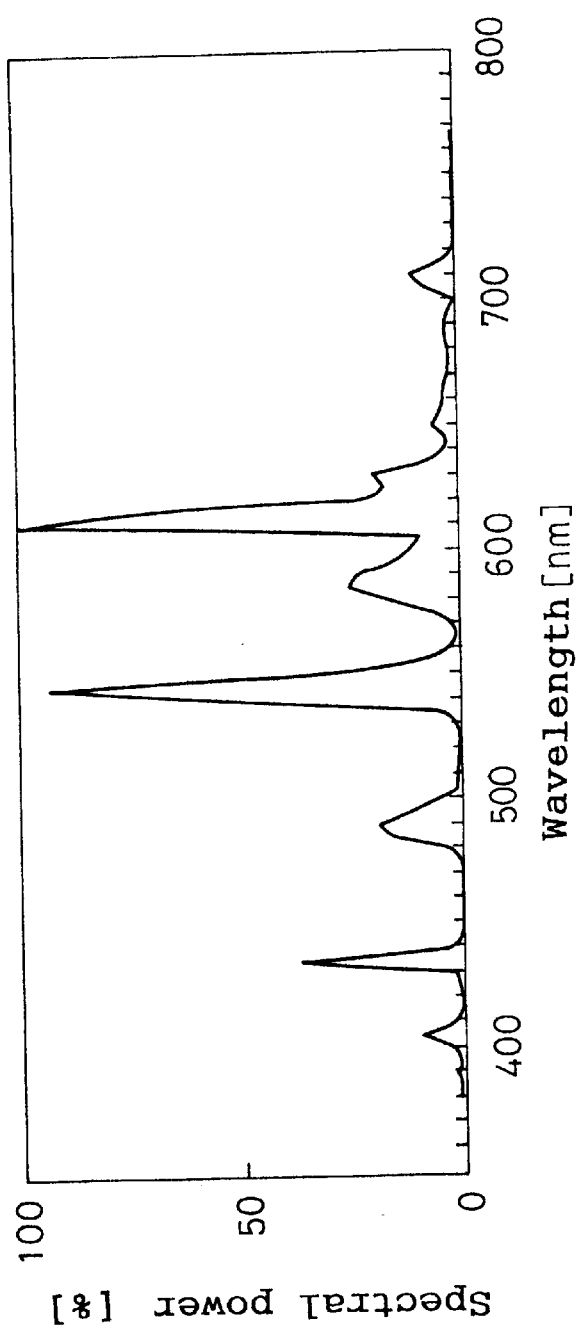
Figure 26:
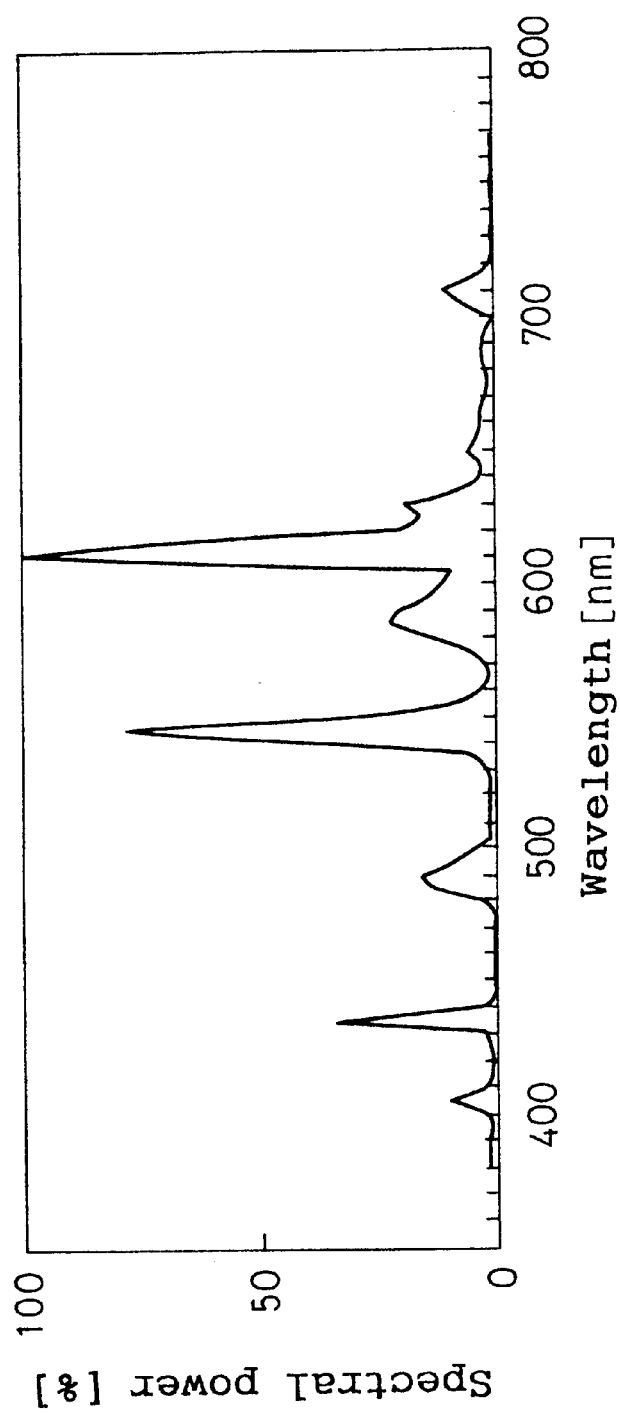

FIG. 22 shows for reference the relation between the chromaticity of l to v of claim 21 and the range of light color of fluorescent lamp of JIS.

In FIG. 22, area 29 represents the chromaticity region of cool white light, area 30 represents the chromaticity region of warm white light and area 31 represents the chromaticity region of incandescent lamp type color of fluorescent lamp. From the FIG. 22 it is apparent that the vertexes other than left-low one of the range of white chromaticity correspond to the l to v. Spectral distribution of an embodiment of the fluorescent lamp when the flux ratio LAP: YOX is changed as shown in 25 through 28 of FIG. 21 are shown in FIG. 23 through FIG. 26.

As an embodiment of the new high-efficiency light source of the invention emitting light of incandescent color, LAP [chemical formula 1] LaPO$_4$:Ce,Tb used as a phosphor having peak emission wavelength in a region from 540 to 560 nm and YOX [chemical formula 2] Y$_2$O$_3$:Eu used as a phosphor having peak emission wavelength in a region from 600 to 620 nm were combined while changing the flux ratio from LAP:YOX=60:40 to LAP:YOX=70:30.

When the flux ratio is set to LAP:YOX=70:30, efficiency can be increased by 10% while decreasing the kinds of phosphor, compared to the conventional three band radiation type fluorescent lamp color.

Figure 27:
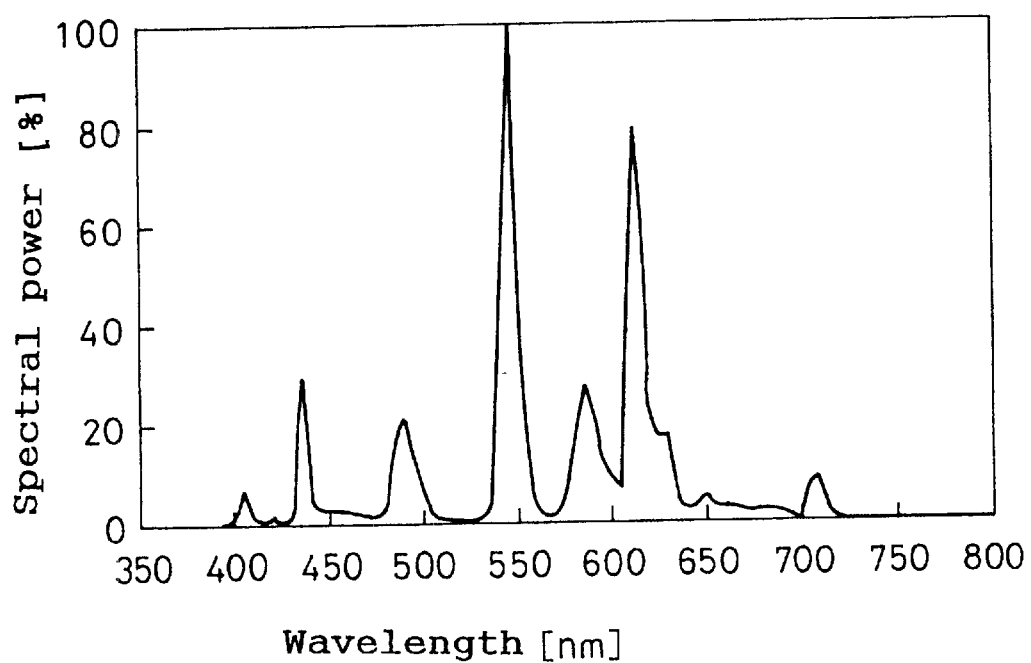
FIG. 27 shows the spectral distribution of a fluorescent lamp according to another embodiment of the invention.

FIG. 27 shows the spectral characteristic of another embodiment of the invention wherein SCA having the composition of (Sr,Ca,Ba)$_{10}$(PO$_4$)$_6$Cl$_2$:Eu is used as a phosphor having peak emission wavelength in a region from 440 to 460 nm, LAP having the composition of LaPO$_4$:Ce,Tb used as a phosphor having peak emission wavelength in a region from 540 to 560 nm and YOX having the composition of Y$_2$O$_3$:Eu used as the phosphor having peak emission wavelength in the region from 600 to 620 nm were combined in a flux ratio of 1:67:32.

Chromaticity values x & y of the fluorescent lamp are (0.4315, 0.4334), while the correlated color temperature is 3317 K and Duv is 12.3. This embodiment makes it possible to generate any desired light color in the chromaticity range of claim 21 and the claim 22 of the invention, by adding a sub-emission to wavelength regions other than the dominant radiation wavelengths.

When constitutin the new high-efficiency light source, similar effect can also be achieved by producing light color equivalent to that of the fluorescent lamp of the invention by means of a metal halide lamp, besides the embodiment which employs the fluorescent lamp described above, thereby providing the following lamps.

The first is a metal halide lamp which has high luminous brightness in mesopic vision and scotopic vision or in a wide field of view while ensuring such a level of color reproduction that allows categorical color perception for surface colors of at least red, green, blue, yellow, white and black.

The second is a metal halide lamp which has whiteness in the light color without causing the sense of incongruity in the light color when used in conjunction with a conventional high temperature light source, while ensuring such a level of color reproduction that allows categorical color perception for surface colors of at least red, green, blue, yellow, white and black.

The third is a metal halide lamp used as a high-efficiency illuminating light source which has light color equivalent to incandescent color without causing the sense of incongruity in the light color when used in conjunction with a conventional low color temperature light source, while ensuring such a level of color reproduction that allows categorical color perception for surface colors of at least red, green, blue, yellow, white and black.

In the case of metal halide lamp, the invention can be achieved by adding a metal halide having radiation in a region from 420 to 530 nm and a metal halide having radiation in a region from 470 to 530 nm to a metal halide having dominant radiation wavelengths in a region from 530 to 580 nm and a region from 600 to 650 nm. While ordinary metal halide lamps employ In (blue radiation), Tl (green radiation) and Na (yellow, red radiation), the invention can be achieved by combining these elements while increasing the In content thereby increasing the intensity of blue radiation.

The invention can also be achieved by combining [chemical formula 17] $NaI.AlCl_3$ or [chemical formula 18] $CaI_2.AlCl_3$ and with thallium halide (for example thallium ionide).

Another metal halide lamp in common use is based on Sc—Na—(Th). The invention can also be achieved by combining this lamp and thallium halide (for example thallium ionide).

The invention can also be achieved by combining a phosphor based on Ce—Na—Cs—(Sm) (for example ionides of these elements) of which Sm content is decreased thereby to decrease the blue radiation component and thallium halide (for example thallium ionide).

As described above, the invention is capable of achieving the following improvements for the new high-efficiency light source.

The first is a light source which has high luminous brightness in mesopic vision and scotopic vision and in wide field of view while ensuring such a level of color reproduction that allows categorical color perception for surface colors of at least red, green, blue, yellow, white and black.

The second is a light source which has whiteness in the light color without causing the sense of incongruity when used in conjunction with the conventional high temperature light source, while ensuring such a level of color reproduction that allows categorical color perception for surface colors of at least red, green, blue, yellow, white and black.

The third is a light source which can be used as high efficiency illuminating light source and has light color equivalent to incandescent lamp without causing the sense of incongruity when used in conjunction with the conventional low color temperature light source, while ensuring such a level of color reproduction that allows categorical color perception for surface colors of at least red, green, blue, yellow, white and black.

The invention has high practical applicability as an efficiency-oriented light source used in such places as emphasis is not placed on the fidelity of color reproduction. For example, the invention is particularly promising as an outdoor illuminating light source, and can be used as outdoor illumination, road illumination, street illumination, vehicle lights, tunnel illumination, public square illumination, warehouse illumination, factory illumination, etc.

Effect of the invention can be maximized when the light source is used with a low illuminance in places where emphasis is not placed on the fidelity of color reproduction, thus making it possible to use the light source in a range of visual environments from scotopic vision to mesopic vision.

According to the invention, proportions of radiation in visual radiation wavelength bands 420 to 530 nm (more specifically 420 to 470 nm and 470 to 530 nm), 530 to 580mn and 600 to 650 nm are controlled in the new high-efficiency light source.

This configuration makes it possible to provide further the following effects.

One is to achieve a high-efficiency illuminating light source which ensures categorical color perception for surface colors of at least red, green, blue, yellow and white, while improving the luminous efficiency in scotopic vision and mesopic vision or in a wide field of view.

Another is to achieve an illuminating light source which has whiteness in the light color, while ensuring such a level of color reproduction that allows categorical color perception for surface colors of at least red, green, blue, yellow, white and black.

The third is to achieve a high-efficiency illuminating light source which has light color equivalent to incandescent lamp, while ensuring such a level of color reproduction that allows categorical color perception for surface colors of at least red, green, blue, yellow, white and black.

It is said from experience that, even in the environment of the same illuminance, ordinary illuminating light sources cause brighter sensation when the correlated color temperature is higher. This is supposedly because radiation from a light source of higher correlated color temperature includes higher inensity of blue or blue-green component.

The effects of the invention will now be described below in comparison with these ordinary illuminating light sources.

Major references of comparison are three band radiation type fluorescent lamps of incandescent lamp light color (3000 K): EX-L, neutral color(5000 K): EX-N and daylight color(6700 K): EX-D. Also used as references of comparison are: ordinary white color fluorescent lamp: FLW which uses halophosphate phosphpor, efficiency-oriented high-pressure sodium lamp: NH1, low-pressure sodium lamp: NX, color rendering-improved high-pressure sodium lamp: NH2, fluorescent mercury lamp: HF and metal halide lamp: MHL.

In order to ensure that the lamp efficiency is not lower than 10%, the invention provides 2B+SCA by adding [chemical formula 3] $(Sr,Ca,Ba)_{10}(PO_4)_6Cl_2$:Eu to the new high-efficiency light source: 2B (2L), 2B+halo-W by adding calcium halophosphate phosphpor (chemical formula 16) $Ca_5(PO_4)_3(F,Cl)$:Sb,Mn and 2B+SAE by adding [chemical formula 11] $Sr_4Al_{14}O_{25}$:Eu. Because the new high-efficiency light source (dual band radiation type fluorescent lamp) has an efficiency 20% or more higher than the three band radiation type daylight fluorescent lamp, even the ordinary flux is superior over the three band radiation type daylight fluorescent lamp. Apart from this, subjective reproduction of brightness will be discussed below.

In the verification of the effect of luminous brightness in mesopic vision and scopic vision, V'(λ)/V(λ) is used as the representative index, and in the verification of the effect of improving the luminous brightness in wide field view, $V_{10}(λ)/V(λ)$ is used representative index.

Figure 28:
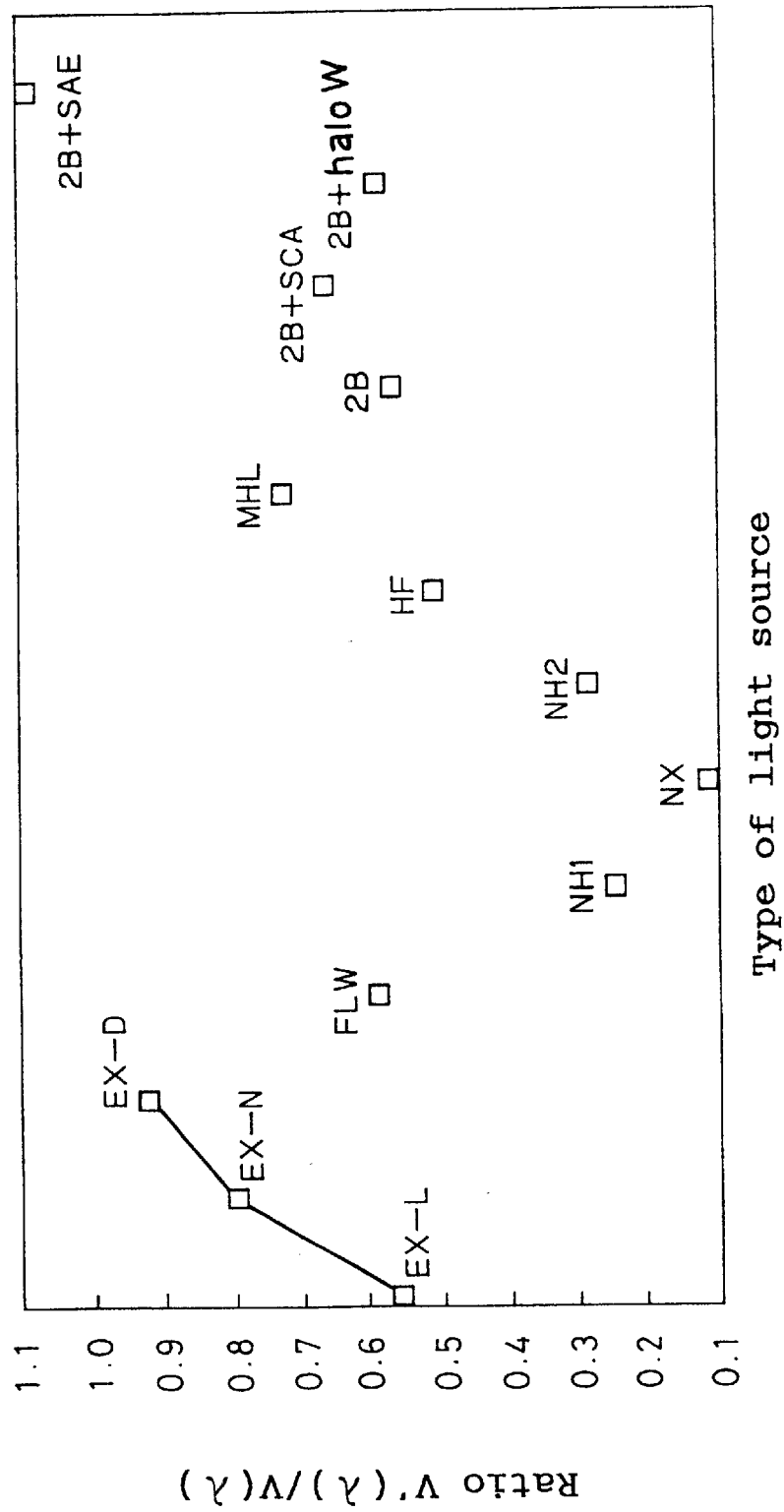
FIG. 28 shows the relation between the value of $V'(\lambda)/V(\lambda)$ and the various light sources.
Figure 29:
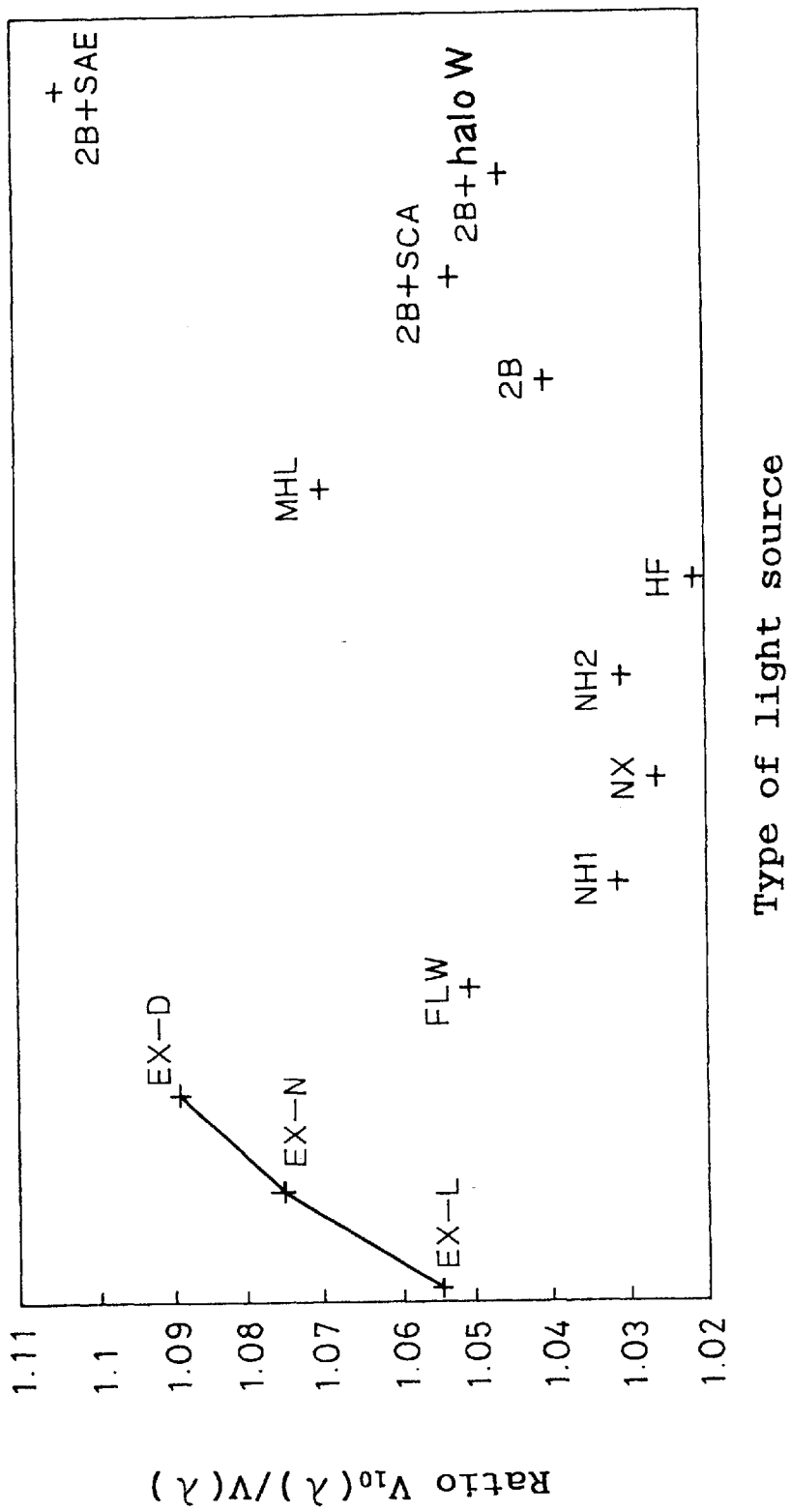
FIG. 29 shows the relation between the value of $V_{10}(\lambda)/V(\lambda)$ and the various light sources.

FIG. 28 shows the relation between the values of V'(λ)/V(λ) and various light sources, and FIG. 29 shows the relation between the values of $V_{10}(λ)/V(λ)$ and various light sources.

These data show that the effect of adding phosphors to the new high-efficiency light source in improving the spectral luminous efficiency is smaller in the case of light emitted over a wide wavelength band such as calcium halophosphate phosphor used in ordinary illuminating light sources, and is greater in the case of phosphors emitting light in a relatively narrower band. That is, the phosphor [chemical formula 3] $(Sr,Ca,Ba)_{10}(PO_4)_6Cl_2$:Eu which radiates in a relatively narrow band with peak emission wavelength in a band from 420 to 470 nm has a sufficient effect of improvement. The phosphor [chemical formula 11] $Sr_2Al_{14}O_{25}$:Eu which radiates in a relatively narrow band with peak emission wavelength in a band from 470 to 530 nm has a great effect of improvement.

While the data of FIG. 28 and FIG. 29 are meaningful only in the mutual relationship thereof, the effect of adding radiation in a region from 470 to 530 nm to the new high-efficiency light source in improving the various luminous efficiencies is greater than the difference between the brightness felt from EX-L(incandescent lamp light color of three band radiation type fluorescent lamp) and the brightness felt from EX-D(day-white color of that of fluorescent lamp), while the illuminance of the illumination of environment of EX-L and that of EX-D are set same.

These effects of the invention have wide applications such as traffic illumination, street illumination, safety light, night light, illumination of automated factory and public illumination for unfrequented space, where such features as energy saving and economy are preferred while the light sources are not required to have a high fidelity of color reproduction and are used with low design illuminance in scotopic vision and mesopic vision.

Also according to the invention, chromaticness of the new fluorescent lamp can be decreased and whiteness can be provided while maintaining the high efficiency, by enhancing the radiation in the wavelength band from 420 to 530 nm.

In order to further efficiently decrease the chromaticness and increase the whiteness, it is preferable that the radiated light energy be concentrated in the wavelength band from 420 to 470 nm on the shorter wavelength side.

There may be an opposite case where incandescent light color of lower correlated color temperature is desirable from the aesthetic point of view. In such a case, because the chromaticity range of light which is acceptable as incandescent color is determined by the invention, a light source which radiates light in this chromaticity range can be made.

INDUSTRIAL APPLICABILITY

As will be understood from the above description, it is made possible to provide a variety of light colors having high whiteness with less sense of incongruity, by using the new high-efficiency light source of the invention in conjunction with a high color temperature light source, and provide a variety of light colors equivalent to incandescent color with less sense of incongruity by using the new high-efficiency light source of the invention in conjunction with TS and low color temperature light source.

We claim:

1. A fluorescent lamp that ensures categorical color perception for surface colors of at least red, green, blue, yellow and white, while improving the luminous efficiency in scotopic vision and mesopic vision or in a wide visual field, the lamp comprising:

a first phosphor that has a peak emission wavelength in a first wavelength region of from 530 to 580 nm and a second phosphor that has a peak emission wavelength in a second wavelength region of from 600 to 650 nm; and a third phosphor that has a peak emission in a third wavelength region of from 420 to 530 nm;

wherein:

dominant radiation is obtained from the first and the second phosphors;

the flux emitted by the third phosphor is 4 to 40% of the total flux emitted by the first and the second phosphors; and the correlated color temperature of the lamp light color is at least 3500 K; and Duv, in which Duv is $\Delta uv \times 1000$ and $\Delta uv$ is the distance of the color point from the Plankian locus on the CIE 1960 chromaticity diagram, is 5 to 70.

2. The fluorescent lamp of claim 1 in which the third phosphor has a peak emission in the third wavelength region, and the third wavelength region is from 470 to 530 nm.

3. A fluorescent lamp that ensures categorical color perception for surface colors of at least red, green, blue, yellow and white, while improving the luminous efficiency in scotopic vision and mesopic vision or in a wide visual field, the lamp comprising:

a first phosphor that has a peak emission wavelength in a first wavelength region of from 530 to 580 nm and a second phosphor that has a peak emission wavelength in a second wavelength region of from 600 to 650 nm; and a third phosphor that has a peak emission in a third wavelength region of from 420 to 530 nm;

wherein:

dominant radiation is obtained from the first and the second phosphors;

light emitted by the lamp is in a region $y<-0.43x+0.60$, $y>0.64x+0.15$, and $x>0.16$ on the x-y chromaticity coordinate plane.

4. The fluorescent lamp of claim 3 in which the third phosphor has a peak emission in the third wavelength region, and the third wavelength region is from 470 to 530 nm.

5. The fluorescent lamp of any one of claims 1 to 4 in which:

the first phosphor is a phosphor activated with either terbium or with terbium and cerium;

the second phosphor is a phosphor activated with europium or manganese; and the third phosphor is a phosphor activated with europium, europium and manganese, antimony, manganese, or antimony and manganese.

6. The fluorescent lamp of any one of claims 1 to 4 in which the third phosphor is a halophosphate phosphor.

7. The fluorescent lamp of any one of claims 1 to 4 in which the third phosphor is selected from the group consisting of $BaMgAl_{10}O_{17}$:Eu, $(Sr,Ca,Ba)_{10}(PO_4)_6Cl_2$:Eu, and $BaMgAl_{10}O_{17}$:Eu,Mn.

8. The fluorescent lamp of any one of claims 1 to 4 in which the third phosphor is $Sr_4Al_{14}O_{25}$:Eu or $Ce(Mg,Zn)Al_{11}O_{19}$:Mn.

9. The fluorescent lamp of either claim 1 or claim 3 in which the third phosphor has a peak emission in the third wavelength region and the third wavelength region is from 420 to 470 nm, and the lamp additionally comprises a fourth phosphor having a peak emission wavelength in a wavelength region of from 470 to 530 nm.

10. The fluorescent lamp of any one of claims 1 to 4 in which the third phosphor has a peak emission in a wavelength region of from 420 to 470 nm and a peak emission wavelength in a wavelength region of from 470 to 530 nm, and the third phosphor is $(Ba,Sr)MgAl_{10}O_{17}$:Eu,Mn.

11. The fluorescent lamp of claim 10 in which the third phosphor is selected from the group consisting of $BaMgAl_{10}O_{17}$:Eu, $(Sr,Ca,Ba)_{10}(PO_4)_6Cl_2$:Eu, and $BaMgAl_{10}O_{17}$:Eu,Mn.

12. A fluorescent lamp that ensures categorical color perception for surface colors of at least red, green, blue, yellow and white, while improving the luminous efficiency in scotopic vision and mesopic vision or in a wide visual field, the lamp comprising:

a dual peak emitting phosphor that has a first peak emission in a first wavelength region of from 530 to 580 nm and a second peak emission in a second wavelength region of from 600 to 650 nm; and a second phosphor that has a peak emission in a third wavelength region of from 420 to 530 nm;

wherein:
dominant radiation is obtained from the dual peak emitting phosphor;

the flux emitted by the second phosphor is 4 to 40% of the total flux emitted by the dual peak emitting phosphor; and the correlated color temperature of the lamp light color is at least 3500 K;

Duv, in which Duv is $\Delta uv \times 1000$, and $\Delta uv$ is the distance of the color point from the Plankian locus on the CIE 1960 chromaticity diagram, is 5 to 70; and the dual peak emitting phosphor comprises $(Ce,Gd,Tb)(Mg,Mn)B_5O_{10}$ and $(Ce,Gd)(Mg,Mn)B_5O_{10}$.

13. The fluorescent lamp of claim 12 in which the second phosphor has a peak emission in the third wavelength region, and the third wavelength region is from 470 to 530 nm.

14. A fluorescent lamp that ensures categorical color perception for surface colors of at least red, green, blue, yellow and white, while improving the whiteness of the light color, the lamp comprising:

a first phosphor that has a peak emission wavelength in a first wavelength region of from 530 to 580 nm and a second phosphor that has a peak emission wavelength in a second wavelength region of from 600 to 650 nm; and a third phosphor that has a peak emission in a third wavelength region of from 420 to 470 nm;

wherein:
dominant radiation is obtained from the first and the second phosphors;

the correlated color temperature of the lamp light color is at least 3500 K; and Duv is within an area of $y<-0.43x+0.60$ in a range from 5 to 70 on the x-y chromaticity coordinate plane, in which Duv is $\Delta uv \times 1000$, and $\Delta uv$ is the distance of the color point from the Plankian locus on the CIE 1960 uv chromaticity diagram.

15. A fluorescent lamp that ensures categorical color perception for surface colors of at least red, green, blue, yellow and white, while improving the whiteness of the light color, the lamp comprising:

a first phosphor that has a peak emission wavelength in a first wavelength region of from 530 to 580 nm and a second phosphor that has a peak emission wavelength in a second wavelength region of from 600 to 650 nm; and a third phosphor that has a peak emission in a third wavelength region of from 420 to 470 nm;

wherein:
the chromaticity points (x,y) of the light emitted by the lamp are located in an area of $y<-0.43x+0.60$, within the region enclosed by a: (0.228, 0.351), b: (0.358, 0.551), c: (0.525, 0.440), d: (0.453, 0.440), e: (0.285, 0.332) on the x-y chromaticity coordinate plane.

16. The fluorescent lamp of either claim 11 or claim 15 in which the flux emitted by the third phosphor is from 4 to 11% of the total flux emitted by the first phosphor and the third phosphor, and the flux emitted by the first phosphor is from 96 to 89% of the total flux emitted by the first phosphor and the third phosphor.

17. The fluorescent lamp of any one claim 11 and claim 15 in which the flux emitted by the second phosphor is 0 to 28% of the total flux emitted by the first second, and third phosphors, and the total flux emitted by the first and third phosphors is 72 to 100% of the total flux emitted by the first, second, and third phosphors.

18. The fluorescent lamp of either claim 11 or claim 15 in which:

the first phosphor is a phosphor activated with either terbium or with terbium and cerium;

the second phosphor is a phosphor activated with europium or manganese;

the third wavelength region is 420 to 150 nm; and the third phosphor is a phosphor activated with europium.

19. The fluorescent lamp of claim 11 in which the third phosphor is selected from the group consisting of $BaMgAl_{10}O_{17}$:Eu, $(Sr,Ca,Ba)_{10}(PO_4)_6Cl_2$:Eu, and $BaMgAl_{10}O_{17}$:Eu,Mn.

20. A fluorescent lamp that ensures categorical color perception for surface colors of at least red, green, blue, yellow and white, while improving the whiteness of the light color, the lamp comprising:

a first phosphor that has a peak emission wavelength in a first wavelength region of from 530 to 580 nm;

wherein:
dominant radiation is obtained from the first phosphor;

the chromaticity points (x,y) of the light emitted by the lamp are located in an area of $y<-0.43x+0.60$, within the region enclosed by a: (0.228, 0.351), b: (0.358, 0.551), c: (0.525, 0.440), d: (0.453, 0.440), e: (0.285, 0.332) on the x-y chromaticity coordinate plane.

21. The fluorescent lamp of claim 20 in which the first phosphor is a phosphor activated with terbium and the lamp additionally comprises a halophosphate phosphor that has a peak emission in the wavelength region 420 nm to 530 nm.

22. A fluorescent lamp that ensures categorical color perception for surface colors of at least red, green, blue, yellow and white, while improving the whiteness of the light color, the lamp comprising:

a dual peak emitting phosphor that has a first peak emission wavelength in a first wavelength region of from 530 to 580 nm and a second peak emission wavelength in a second wavelength region of from 600 to 650 nm; and a second phosphor that has a peak emission in a third wavelength region of from 420 to 150 nm;

wherein:
the chromaticity points (x,y) of the light emitted by the lamp are located in an area of $y<-0.43x+0.60$, within the region enclosed by a: (0.228, 0.351), b: (0.358, 0.551), c: (0.525, 0.440), d: (0.453, 0.440), e: (0.285, 0.332) on the x-y chromaticity coordinate plane; and the dual peak emission phosphor comprises $(Ce,Gd,Tb)(Mg,Mn)B_5O_{10}$ and $(Ce,Gd)(Mg,Mn)B_5O_{10}$.

23. A fluorescent lamp which ensures categorical color perception for surface colors of at least red, green, blue, yellow and white, the lamp comprising:

a first phosphor that has a peak emission wavelength in a first wavelength region of from 530 to 580 nm and a second phosphor that has a peak emission wavelength in a second wavelength region of from 600 to 650 nm; and in which:
   dominant radiation is obtained from the first and the second phosphors;
   the correlated color temperature is at least 1700 K;
   Duv of the emission light color, in which Duv is $\Delta uv \times 1000$, and $\Delta uv$ is the distance of the color point from the Plankian locus on the CIE 1960 uv chromaticity diagram, is 5 to 70; and
   the region of the chromaticity point (x,y) inside the quadratic curve of $fx^2+gy^2+hxy+ix+jy+k=0$, in which f=0.6179, g=0.6179, h=−0.7643, i=−0.2205, j=−0.1765, k=0.0829, overlap each other on the x-y chromaticity coordinate plane.

24. A fluorescent lamp which ensures categorical color perception for surface colors of at least red, green, blue, yellow and white, the lamp comprising:
   a first phosphor that has a peak emission wavelength in a first wavelength region of from 530 to 580 nm and a second phosphor that has a peak emission wavelength in a second wavelength region of from 600 to 650 nm; and
   in which:
      dominant radiation is obtained from the first and the second phosphors; and
      the region of the chromaticity point (x,y) is inside the quadratic curve of $fx^2+gy^2+hxy+ix+jy+k=0$, in which f=0.6179, g=0.6179, h=−0.7643, i=−0.2205, j=−0.1765, k=0.0829, other than the area defined by l to v range enclosed by line segments connecting the chromaticity points l: (0.1575, 0.4283), m: (0.4594, 0.3971), n: (0.4214, 0.3887), o: (0.4171, 0.3846), p: (0.3903, 0.3719), q: (0.3805, 0.3642), r: (0.3656, 0.3905), s: (0.3938, 0.4097), t: (0.4021, 0.4076), u: (0.411, 0.4233), and v: (0.418, 0.4185) on the x-y chromaticity coordinate plane.

25. The fluorescent lamp of either claim 23 or claim 24 in which the flux emitted by the first phosphor is 70 to 59% of the total flux emitted by the first phosphor and the second phosphor and the flux emitted by the second phosphor is from 30 to 41% of the total flux emitted by the first phosphor and the second phosphor.

26. The fluorescent lamp of any one of claims 23 or 24 in which:
   the lamp comprises the first phosphor and the second phosphor;
   the first phosphor is a phosphor activated with either terbium or with terbium and cerium; and
   the second phosphor is a phosphor activated with europium or manganese.

27. A fluorescent lamp which ensures categorical color perception for surface colors of at least red, green, blue, yellow and white, the lamp comprising:
   a duel peak emitting phosphor that has a peak emission wavelength in a first wavelength region of from 530 to 560 nm and in a second wavelength region of from 600 to 620 nm;
   a second phosphor having a peak emission in a third wavelength range of 420 to 530 nm;
   in which:
      dominant radiation is obtained from the first and the second phosphors;
      the correlated color temperature is at least 1700 K;
      Duv of the emission light color, in which Duv is $\Delta uv \times 1000$, and $\Delta uv$ is the distance of the color point from the Plankian locus on the CIE 1960 uv chromaticity diagram, is 5 to 70; and
      the flux emitted by the emission having its peak in the range of 420 to 530 nm is 0 to 3%, the flux emitted by the emission having its peak in the range of 530 to 560 nm is 59 to 71%, and the flux emitted by the emission having its peak in the range of 600 to 620 nm is 41 to 26%, based on the total flux emitted by the emission having its peak in the range of 420 to 530 nm, the emission having its peak in the range of 530 to 560 nm, and the emission having its peak in the range of 600 to 620 nm.

28. A fluorescent lamp that ensures categorical color perception for surface colors of at least red, green, blue, yellow and white, while improving the luminous efficiency in scotopic vision and mesopic vision or in a wide visual field, the lamp comprising:
   a dual peak emitting phosphor that has a first peak emission in a first wavelength region of from 530 to 580 nm and a second peak emission in a second wavelength region of from 600 to 650 nm; and
   wherein:
      dominant radiation is obtained from the dual peak emitting phosphor;
      the correlated color temperature is at least 1700 K;
      Duv of the emission light color, in which Duv is $\Delta uv \times 1000$, and $\Delta uv$ is the distance of the color point from the Plankian locus on the CIE 1960 uv chromaticity diagram, is 5 to 70; and
      the region of the chromaticity point (x,y) inside the quadratic curve of $fx^2+gy^2+hxy+ix+jy+k=0$, in which f=0.6179, g=0.6179, h=−0.7643, i=−0.2205, j=−0.1765, k=0.0829, overlap each other on the x-y chromaticity coordinate plane; and
      the dual peak emitting phosphor comprises $(Ce,Gd,Tb)(Mg,Mn)B_5O_{10}$ and $(Ce,Gd)(Mg,Mn)B_5O_{10}$.

* * * * *

UNITED STATES PATENT AND TRADEMARK OFFICE
CERTIFICATE OF CORRECTION

PATENT NO.      : 6,414,426 B1
DATED           : July 2, 2002
INVENTOR(S)     : Akashi et al.

It is certified that error appears in the above-identified patent and that said Letters Patent is hereby corrected as shown below:

<u>Title page,</u>
Item [56], OTHER PUBLICATIONS, "Complied" should read -- Compiled --

<u>Column 28,</u>
Lines 4, 10, 16 and 24, "11" should read -- 14 --.
Lines 22 and 56, "150" should read -- 470 --.

<u>Column 29,</u>
Line 35, "0.1575" should read -- 0.4775 --.
Line 39, "0.411" should read -- 0.4341 --.
Line 39, "0.418" should read -- 0.4348 --.

Signed and Sealed this

Twenty-fifth Day of March, 2003

JAMES E. ROGAN
*Director of the United States Patent and Trademark Office*